United States Patent
Rajendran et al.

(10) Patent No.: US 10,614,187 B2
(45) Date of Patent: Apr. 7, 2020

(54) SYSTEM, METHOD AND COMPUTER-ACCESSIBLE MEDIUM FOR SECURITY-CENTRIC ELECTRONIC SYSTEM DESIGN

(71) Applicant: NEW YORK UNIVERSITY, New York, NY (US)

(72) Inventors: Jeyavijayan Rajendran, Brooklyn, NY (US); Ramesh Karri, New York, NY (US); Ozgur Sinanoglu, Abu Dhabi (AE)

(73) Assignee: New York University, New York, NY (US)

(*) Notice: Subject to any disclaimer, the term of this patent is extended or adjusted under 35 U.S.C. 154(b) by 0 days.

(21) Appl. No.: 15/099,826

(22) Filed: Apr. 15, 2016

(65) Prior Publication Data

US 2016/0306902 A1 Oct. 20, 2016

Related U.S. Application Data

(60) Provisional application No. 62/148,417, filed on Apr. 16, 2015.

(51) Int. Cl.
*G06F 17/50* (2006.01)
*G06F 21/79* (2013.01)

(52) U.S. Cl.
CPC ............ *G06F 17/505* (2013.01); *G06F 21/79* (2013.01); *G06F 2217/06* (2013.01)

(58) Field of Classification Search
CPC ..... G06F 17/505; G06F 21/79; G06F 2217/06
See application file for complete search history.

(56) References Cited

U.S. PATENT DOCUMENTS

| | | | |
|---|---|---|---|
| 2009/0288059 A1* | 11/2009 | Dimou | G06F 9/3869 716/104 |
| 2011/0113392 A1* | 5/2011 | Chakraborty | G06F 17/505 716/102 |

OTHER PUBLICATIONS

Bailey, Brian "Is High-Level Synthesis Ready for . . . " http://www.edn.com/design/integrated-circuit-design/4375454/Is-high-level-snythesis-ready-for-prime-time., Jun. 15, 2012.
Moretti, Gabe "The Growth of High Level Synthesis," EDAmarket, Issue 018, Aug. 2012.
Gajski, D.D. et al, "High Level Synthesis: Introduction to Chip and System Design," Kluwer Academic Publishers, pp. C1-368, 1993.

(Continued)

*Primary Examiner* — Nha T Nguyen
(74) *Attorney, Agent, or Firm* — Hunton Andrewas Kurth LLP

(57) ABSTRACT

An exemplary system, method and computer-accessible medium can be provided which can include, for example, generating a super control dataflow graph(s) (CDFG) by applying a plurality of electronic system level ESL design constraints associated with an integrated circuit, determining an upper bound(s) number and a lower bound(s) number based on a number of CDFGs in the super CDFG(s)—with each number being one metric of a capability of the integrated circuit to resist reverse engineering attack—, and inserting a component(s) into a register transfer level netlist to effectuate a modification of the upper bound(s) and the lower bound(s).

20 Claims, 9 Drawing Sheets

(56) References Cited

OTHER PUBLICATIONS

Digitimes Research, "Trends in the Global IC Design . . . ," http://www.digitimes.com/Reports/Reports.asp? datepublish+2012/3/13\&pages=RS\&seq=400\&read=toc, Mar. 13, 2012.
Iarpa, "Trusted Integrated Chips (TIC) Program," https://www.fbo.gov/utils/view?id=b8be3d2c5d5babbdffc697c370247a6, Oct. 26, 2011.
Semi, "Innovation is at risk as Semiconductor Equipment and Materials Industry . . . ," www.semi.org/en/Press/P043775, Apr. 29, 2008.
"Dangerous Fakes," Business Week, http://www.businessweek.com/magazine/, 2008.
KPMG,"Managing the Risks of Counterfeiting in the Information Technology," www.agmaglobal.org/press_events/press_docs/Counterfeit_WhitePaper_Final.pdf, 2006.
Torrance, Randy et al., "The State-of-the-Art in Semiconductor Reverse Engineering," IEEE/ACM Design Automation Conference, pp. 333-338, 2017.
Alkabani, Yousra M. et al., "Active hardware Metering for Intellectual Property . . . ," 16th USENIX Security Symposium, pp. 291-306, 2007.
Chakraborty, R. et al., "HARPOON: An Obfuscation-Based SoC Design . . . ," IEEE, vol. 28, No. 10, pp. 1493-1502, Oct. 2009.
Hennessy, John L. et al,, "Computer Architecture: A Quantitative Approach," Morgan Kaufmann Publishers, pp. 1493-1602, 1996.
Rajendran, Jeyvijayan et al., "Security Analysis of Logic Obfuscation," Proc. of IEEE/ACM Design Automation Conference, pp. 83-89, 2012.
Kuo, S.M. et al., "Real-Time Digital Signal Processing: Implementations and Applications, . . . ," Wiley & Sons LTD, Second Edition, 2006.
Alkabani, Yousra et al., "Remote Activation of ICs for Piracy Prevention and . . . ," Proc. of the IEEE/ACM International Conference on Computer-Aided Design, pp. 674-677, 2007.
Subramanyan, Pramod et al., "Reverse Engineering Digital Circuits Using Functional . . . ," Proc. of IEEE/ACM Design Automation and Test in Europe, pp. 1277-1280, 2013.
Dai, S. et al., "Flushing-Enabled Loop Pipelining for High-Level Snythesis," IEEE/ACM Design Automation Conference, pp. 1-6, 2014.
Mirhoseini, Azalia et al., "Idetic: A High-Level Synthesis Approach . . . ," IEEE International Conference on Pervasive Computing and Communications, pp. 216-224, 2013.
Roy, J. et al., "EPIC: Ending Piracy of Integrated Circuits," IEEE Computer, vol. 43, No. 10, pp. 30-38, 2010.
Baumgarten, Alex et al., "Preventing IC Piracy Using Reconfigurable Logic Barriers," IEEE Design and Test of Computers, vol. 27, No. 1, pp. 66-75, 2010.
Rosinger, Paul et al "Scan Architecture with Mutually Exclusive Scan Segment Activation for Shift- and Capture-Power Reduction," IEEE Transactions on Computer-Aided Design of integrated Circuits and Systems, vol. 23, No. 7, pp. 1142-1153, Jul. 2004.

* cited by examiner

```
int main (int X, int *Y, int *Z1, int *Z2 : num16) {
      int in1 = (X * K1);
      Y = biquad(in1, K2, K3, K4, K5, *Z1, *Z2);
      return Y;
}
int biquad(int in, int a1, int a2, int b1, int b2, int *Z1, int *Z2){ return state + (b1 × *Z1) + (b2 × *Z2);
}
```

SYSTEM, METHOD AND COMPUTER-ACCESSIBLE MEDIUM FOR SECURITY-CENTRIC ELECTRONIC SYSTEM DESIGN

CROSS-REFERENCE TO RELATED APPLICATION(S)

This application relates to and claims priority from U.S. Patent Application No. 62/148,417, filed on Apr. 16, 2015, the entire disclosure of which is incorporated herein by reference.

FIELD OF THE DISCLOSURE

The present disclosure relates generally to a computer-aided system design, and more specifically, to exemplary embodiments of system, method and computer-accessible medium for security-centric electronic system design.

BACKGROUND INFORMATION

Exemplary Electronic System Level ("ESL") Tools Improve Productivity

The complexity of integrated circuits ("ICs") is growing exponentially. (See, e.g., Reference 1). To keep pace with this complexity, ESL computer-aided design ("CAD") tools (e.g., also called high-level synthesis tools) are being used to design ICs. For example, 14 out of the top 20 semiconductor companies use ESL tools. (See, e.g., References 2-4). ESL tool sales were around $460 million in 2011. (See, e.g., Reference 1). The value of the ICs produced using ESL tools can be at least an order of magnitude more.

ESL design have the following advantages (see, e.g., References 4 and 5):

1) Designing at a higher level of abstraction decreases the design time. Designing an IC at ESL can be faster than designing at the register transfer level ("RTL"). (See, e.g., Reference 6-13).
2) Design specification can be simpler at higher levels of abstraction. Specifying a million-gate design in RTL requires 300K lines of code. Specifying in C/C++ reduces the complexity by up to 10 times. (See, e.g., Reference 14).
3) Design verification can be easier at higher levels of abstraction. (See, e.g., References 5 and 15).
4) Specifying the target IC and the software that will run on it in the same specification language (e.g., C/C++) facilitates exploration of hardware/software trade-offs.

FIG. 1 shows a standard ESL design flow 100 that can begin at the designer stage 102. Specification 104 in C/C++ can be the starting point. A High-Level Description 106 can be provided to the ESL tool 108 to convert this High-Level Specification 106 into a RTL representation 110. Physical design tools can generate layout masks, which can then be sent to a foundry. The foundry can manufacture ICs which can be tested, packaged and sold.

Exemplary Globalized IC Design Introduces Security Vulnerabilities

The cost of owning a foundry in 2015 was projected to be $5 billion. (See, e.g., Reference 16). Only a small number of high-end commercial foundries remain. (See, e.g., Reference 17). Companies that do not own a foundry outsource their fabrication to these foundries. This results in security vulnerabilities. (See, e.g., References 18-23). An attacker in the foundry or a rogue user (e.g., element 110 in FIG. 1 (see, e.g., Reference 18)), can reverse engineer the functionality of an IC/IP, and then steal/claim its ownership. (See, e.g., Reference 24). An untrustworthy foundry can overbuild ICs and sell the excess illegally. (See, e.g., References 25-27). Additionally, a rogue element in a foundry can insert malicious circuits (e.g., hardware Trojans) into the design. (See, e.g., Reference 21).

To thwart attacks from rogue elements in the foundry, and from attacks from malicious users, researchers have developed procedures to harden a design. (See, e.g., References 25-27). These exemplary hardening procedures can lock the IC using a key. The IC can become functional only when the valid key can be applied, and can remain non-functional otherwise.

An exemplary Hardened Register-Transfer Level Design 114 can be generated by a designer, using various exemplary IP protection techniques 112. For example, as shown in FIG. 1, the Hardened Register-Transfer Level Design 114 can generate a Gate-Level Synthesis 115, and a Gate-Level Netlist 118. The Gate-Level Netlist 118 can be used to generate a Physical Synthesis 120 and a Layout 122. The hardened design, without the key, can then be sent to the Foundry 124 to be manufactured 126 as non-functional IC's 130. The manufactured IC's 130 can be returned to the designer 102, where they can be activated 132 as Functional IC's 134. For example, the designer can program the secret key by loading it in a tamper-evident memory. Reverse engineering 128 a hardened design can be difficult for an attacker in the foundry.

Exemplary Hardening ESL-Generated Designs

A design generated by an ESL tool can have two parts: The datapath that can consist of operators, registers, multiplexers, and the buses/wires that connect them, and the controller that can orchestrate the read and write operations between registers and operators. The controller can implement a finite state machine ("FSM") of the design. An ESL-generated controller can have two parts: (i) the next state logic to control the state transitions, and (ii) the output logic to orchestrate the read and write operations in the current state.

An ESL-generated design can be hardened in two ways. First, the next-state logic can be hardened because without the next-state logic, the timing and source of read/write operations may not be known. In addition, controllers can be minuscule (e.g., <1% of hardware) (see, e.g., Reference 28), and hardening them can incur low power, area, and delay overhead. Alternatively, the datapath can be hardened. However, it is expensive; it can incur an approximately 25% overhead to provide reasonable security. (See, e.g., Reference 29). Thus, the state-of the-art hardening procedures can harden only the next-state logic of the controller in ESL-generated designs. (See, e.g., References 25-27).

Thus, it may be beneficial to provide an exemplary system, method and computer-accessible medium for security-centric electronic system design, which can overcome at least some of the deficiencies described herein above.

SUMMARY OF EXEMPLARY EMBODIMENTS

An exemplary system, method and computer-accessible medium can be provided which can include, for example, generating a super control dataflow graph(s) (CDFG) by applying a plurality of electronic system level ESL design constraints associated with an integrated circuit, determining an upper bound(s) number and a lower bound(s) number based on a number of CDFGs in the super CDFG(s), and inserting a component(s) into a register transfer level netlist to effectuate a modification of the upper bound(s) and the lower bound(s).

In some exemplary embodiments of the present disclosure, the ESL design constraints can be generated based on a high-level synthesis apparatus(es). The super CDFG(s) can be generated by applying the ESL design constraints to the RTL netlist. The RTL netlist description can include a particular netlist description having at least one hidden controller, and the super CDFG(s) can be generated based on the particular netlist. The upper bound(s) and the lower bound(s) can be determined based on the particular netlist.

In some exemplary embodiments of the present disclosure, the component(s) can be inserted into the particular netlist, for example, such that the integrated circuit can be further resilient to an attack(s). The upper bound(s) and the lower bound(s) can each be a metric(s) of a capability of the integrated circuit to resist a reverse engineering attack(s). The RTL netlist can be a RTL netlist of an integrated circuit which can include a datapath(s) and a controller part(s). The component(s) can include a dummy component(s).

In certain exemplary embodiments of the present disclosure, the dummy component(s) can include an extra state(s) in a finite state machine, which can be an unused state(s) or a state(s) with no outgoing transition. The state(s) with no outgoing transition can be or include a black-hole state(s). The dummy component(s) can include a transition(s) in a finite state machine, which can be an invalid transition(s). The super CDFG(s) can be or include a plurality of super CDFGs, and a number of super CDFGs can be based on a graph-theoretic formulation. The component(s) can be or include a plurality of components, and a number of super CDFGs can be based on a product of a number of possible components and a number of possible sets of inputs.

These and other objects, features and advantages of the exemplary embodiments of the present disclosure will become apparent upon reading the following detailed description of the exemplary embodiments of the present disclosure, when taken in conjunction with the appended claims.

BRIEF DESCRIPTION OF THE DRAWINGS

Further objects, features and advantages of the present disclosure will become apparent from the following detailed description taken in conjunction with the accompanying Figures showing illustrative embodiments of the present disclosure, in which.

Figure 1:
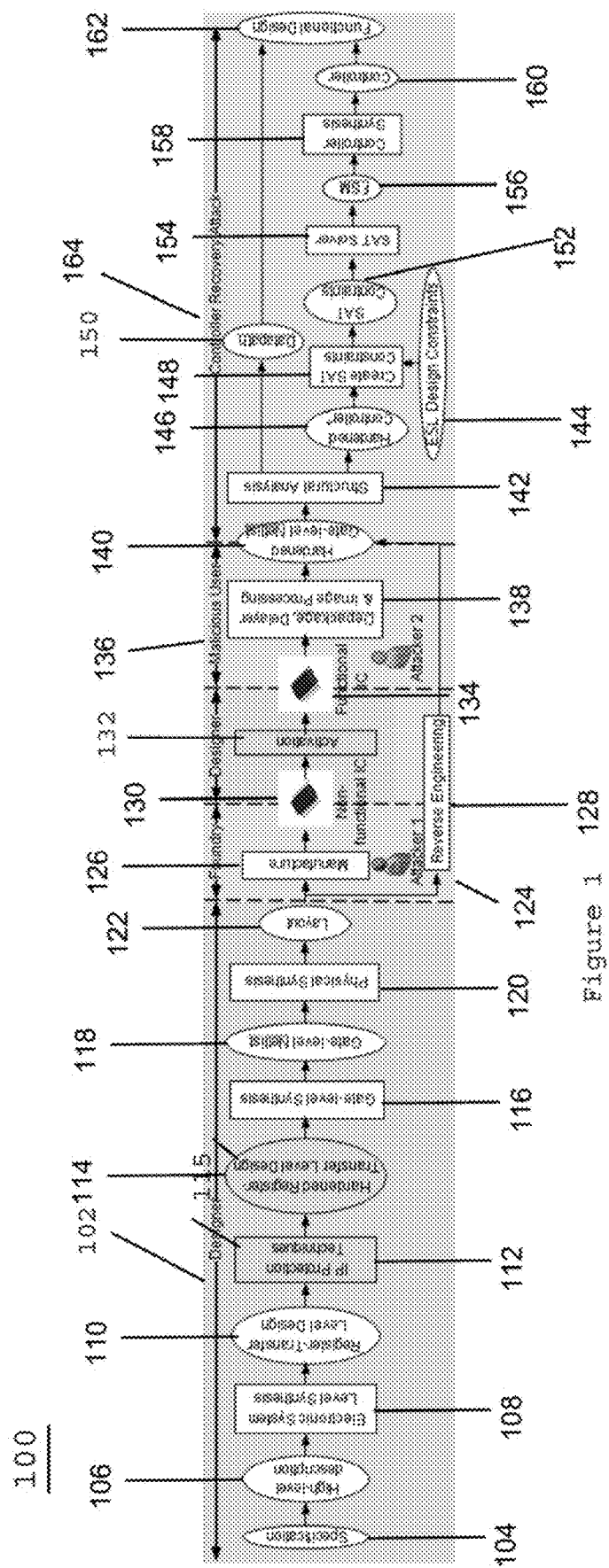
FIG. 1 is a flow diagram of a procedure for generating an RTL.

Throughout the drawings, the same reference numerals and characters, unless otherwise stated, are used to denote like features, elements, components or portions of the illustrated embodiments. Moreover, while the present disclosure will now be described in detail with reference to the figures, it is done so in connection with the illustrative embodiments and is not limited by the particular embodiments illustrated in the figures and the appended claims.

DETAILED DESCRIPTION OF EXEMPLARY EMBODIMENTS

The exemplary system, method and computer-accessible medium, according to an exemplary embodiment of the present disclosure, can be used to recover the hardened controller generated by an ESL tool by leveraging heuristics in ESL tools. For example, the exemplary system, method and computer-accessible medium can be used, for example, as:

1) An attack to recover hardened controllers in ESL generated datapath-dominated designs. The attack can exploit the design methodology underlying all ESL tools;
2) A security metric to quantify the strength of designs generated by ESL tools. It can be defined as the size of the search space that the attacker has to explore in recovering the controller. A graph-theoretic formulation can be provided to quantify this metric.
3) A secure ESL design flow that can add decoy connections to maximize the security metric, and thus, thwart the controller recovery attack; and/or
4) A demonstration of attacks and defenses on designs generated by five state-of-the-art ESL tools.

Exemplary ESL Design Methodology

Figures 2A, 2B:
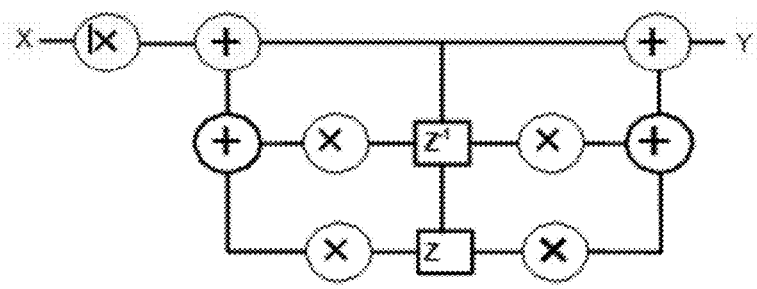
FIG. 2A is a diagram of an ESL design flow Biquad filter according to an exemplary embodiment of the present disclosure.
FIG. 2B is a C programming language specification of a Biquad filter according to an exemplary embodiment of the present disclosure.

The following exemplary ESL design methodology is shown and described using an exemplary Biquad filter ("BQF"). (See, e.g., Reference 30). An exemplary BQF block schematic is shown in FIG. 2A. The exemplary C description of BQF is shown in FIG. 2B. A BQF can filter the input X and produce the output Y using four additions (e.g., + in FIG. 2A), five multiplications (e.g., x in FIG. 2A), two delay operations (e.g., $Z^{-1}$ in FIG. 2A), and five constants.

An exemplary ESL tool can transform this specification as follows: (i) it can create the control data flow graph ("CDFG") shown in FIG. 2C, (ii) it can schedule the operations to clock cycles (e.g., FIG. 2C), (iii) it can interconnect the operators and registers (e.g., FIG. 2D), and/or (iv) it can generate the controller from the FSM. (See e.g., FIG. 2E).

Exemplary State-of-the-Art Hardening Procedures

An exemplary controller can be hardened by adding extra states and/or transitions in the FSM. Some states in the original FSM can be replicated (see, e.g., Reference 31), invalid transitions between states can be added (see, e.g., Reference 26), unused states can be utilized (see, e.g., Reference 25) and additional states with no outgoing transitions, for example, black-hole states (see, e.g., Reference 25), can be added. In these exemplary procedures, for example, only a valid key can yield the correct function. An invalid key can lead the design into invalid states through illegal transitions, and eventually into black-hole states, where the design can be stuck.

The exemplary controller hardening procedure can provide at least two security guarantees (see, e.g., References 25-27): (i) an attacker cannot classify a state as valid or invalid, and (ii) an attacker cannot reverse engineer the FSM implemented by the controller because it can be exponentially hard to enumerate all possible state transitions.

Exemplary Controller Recovery Attack on ESL-Generated Designs

An attacker may not directly reverse engineer a hardened controller of an ESL-generated design. (See, e.g., References 25-27, and 31). However, the architectural models that underlying ESL tools and the ESL design methodology can prove sufficient hints for an attacker to recover the controller; circumventing the outlined controller hardening procedures. After recovering the controller of an ESL-generated design, an attacker can pirate the design, insert Trojans into it and/or overbuild the ICs.

Exemplary Threat Model

The attacker, somewhere in the fabrication flow, can either obtain the hardened controller in GDSII format (see, e.g., Reference 21) and reverse engineer it, or can obtain the chip and reverse engineer it by Depackaging, Delayering and Image Processing (procedure 138 of FIG. 1). These attacks, illustrated in FIG. 1 (see, e.g., Reference 18), have been demonstrated on actual processors such as NXP PN544 (see, e.g., Reference 24) to extract the netlist. While the specification/datasheet of the design can be public information that can reveal details, such as the schedule length and latency, the attacker does not know the proprietary procedure implemented by the exemplary design.

The following assumptions can be made based on the security guarantees of active metering and logic obfuscation. (See, e.g., References 25-27, and 31). These can be worst-case assumptions for the controller recovery attack. First, an attacker cannot distinguish between valid and invalid states, including the black-hole states, and between valid and invalid state transitions. Next, the attacker does not know the number of states in the controller and does not know the key to unlock the controller. Additionally, inferring the FSM from the hardened netlist can be computationally infeasible. (See, e.g., References 25-27 and 31). Thus, the attacker does not have useful information about the next-state logic of the controller. However, the attacker can have access to the unprotected controller output logic and the unprotected datapath.

Exemplary Attack Description

The starting point of the attack can be the hardened layout as shown in FIG. 1 (e.g., during the Controller Recovery Attack 164). The attack can have five steps, which can include, for example:

1) Reverse engineering the Hardened Gate-Level Netlist 140 from the layout;
2) Analyzing the Hardened Gate-Level Netlist 140 to identify the different components in the design and their interconnections (e.g., Hardened Controller 146) using a Structural Analysis procedure 142;
3) Using ESL Design Constraints 144 to create Boolean Satisfiability ("SAT") Constraints formula 152 (e.g., using element 148) based on the connectivity of the components in the design and the heuristics used by ESL tools;
4) Using SAT Solver 154 to solve the SAT formula to recover the original FSM 156, and design a Controller 160 for this FSM 156 using a Controller Synthesis 158; and
5) Stitching the recovered controller with the datapath to recover a Functional Design 162.

Exemplary ESL (Datapath) Constraint 1

The first two steps can include, for example, identifying operators, registers, multiplexers, and the interconnection network. ESL tools can instantiate RTL operators to perform the operations in the CDFG. An attacker can identify the operators and multiplexers in the gate-level netlist by equivalence checking against a library of components. (See, e.g., Reference 32). This can reveal the operators, their latency, and the number and size of the inputs and outputs. Extraction of operators from gate-level netlist has been demonstrated on industry-strength processors. (See, e.g., Reference 32).

To identify the registers, paths between operators and flipflops can be used to distinguish flip-flops belonging to registers and controllers. If an operator or an input can write to a set of flip-flops, then that set of flip-flops can be grouped into registers. Hardcoded constants can be similarly identified. (See, e.g., Reference 24).

Example 1: attacker can identify the operators MUL1-MUL5, ADD1 and ADD2 in the BQF. Their latency (e.g., 1 clock cycle for the adders; 2 clock cycles for the multipliers) can be determined. Next, in the BQF design in FIG. 2D, the circuit path between MUL1 and R1 can facilitate MUL1 to write to R1. Consequently, one can determine that R1 can hold the intermediate results of MUL1. Similarly, the relationships between other operators and registers can be identified.

The following constraints can provide controller specific information. Designs with an initialization interval of 1 can be easier to reverse engineer as each operator can execute only one operation, and each register can store only one variable. However, the reverse engineering can be more difficult for designs with resource sharing, where an operator can execute multiple operations, and the registers can store multiple variables. Thus, the constraints for the latter case can be derived, as the former case can be a subset of the latter case.

Exemplary ESL (Controller Select Signal) Constraint 2

Figure 2C:
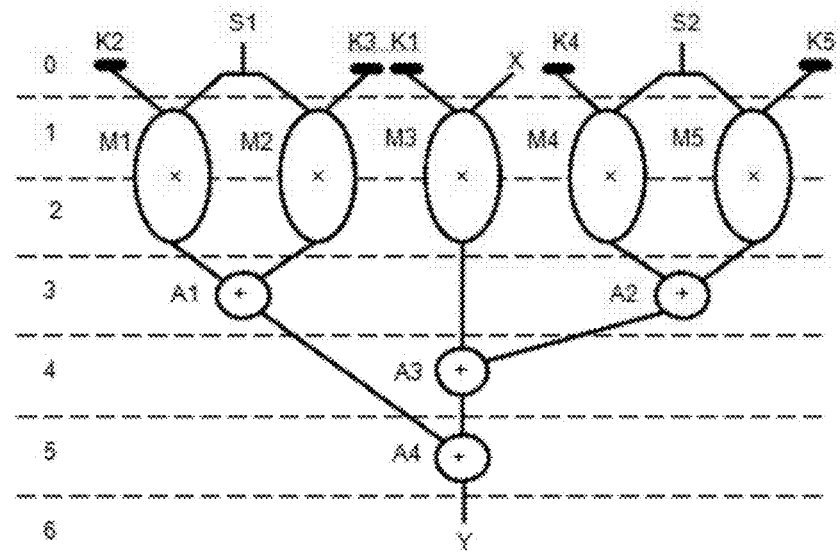
FIG. 2C is a diagram illustrating the control data flow according to an exemplary embodiment of the present disclosure.
Figure 2D:
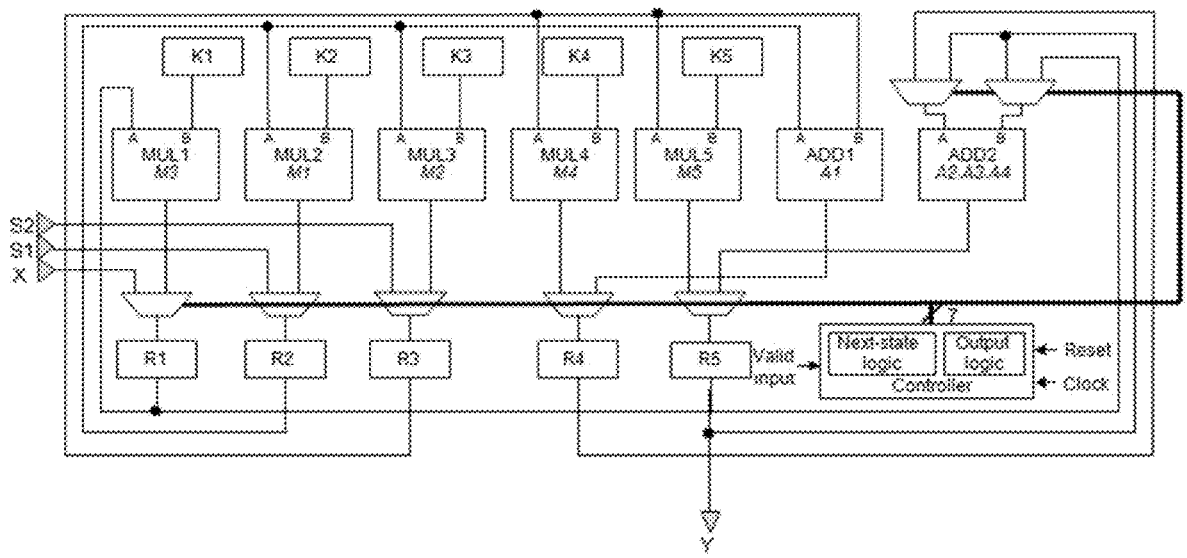
FIG. 2D is a schematic illustrating a RTL design according to an exemplary embodiment of the present disclosure.

Select signals can be the only signals (e.g., apart from clock and reset3) that can be connected to all the multiplexers at the inputs of the operators and registers. An attacker can determine the multiplexer select signals by tracing the set of signals that can be connected to every operator and register. Such wire-tracing procedures can be used in digital design and reverse engineering. (See, e.g., Reference 24). Example 2: FIG. 2D illustrates this observation.

Exemplary ESL (Controller Output Logic) Constraint 3

Figure 3:
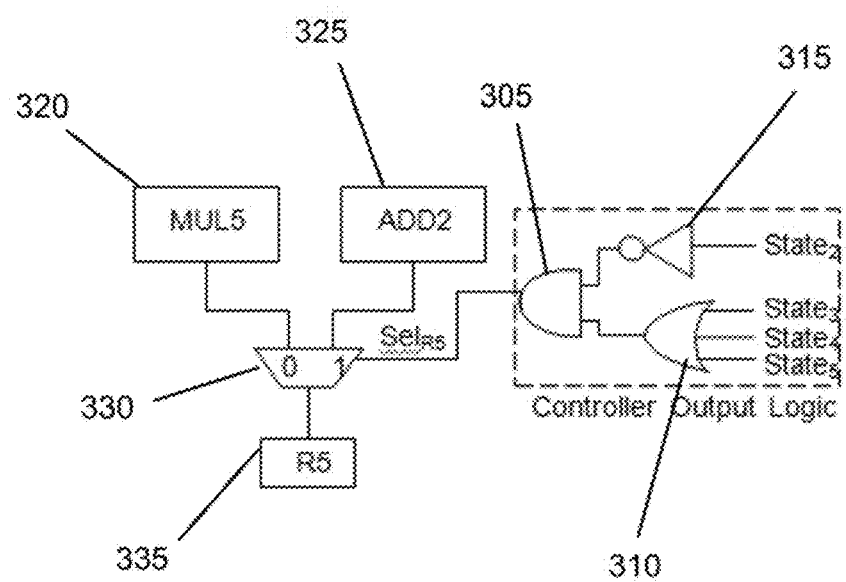
FIG. 3 is a schematic illustrating the selection of logic for a register R5 in a Biquad filter design according to an exemplary embodiment of the present disclosure.

The controller output logic, if not protected, can reveal the relationship between the state signals and the multiplexer select signals. Select signals can be used to choose among multiple sources of read/write operators and enable read/write operations. Example 3: As shown in FIG. 3, the unprotected output controller logic (e.g., the AND gate 305, OR gate 310 and NOT gate 315) depicts the Boolean relationship between the state signals and SelR5.

Example 4: Consider the design in FIG. 2D. When State5 can be active, it can enable Readc, ADD2, A, R4, Readc, ADD2, B, R5, Writec, ADD2 and R5 operations. All other read/write operations can be disabled. Also, consider the selection logic of R5 (element 335) shown in FIG. 3. It can facilitate MUL5 (element 320) to write (through a component-element 330) to R5 (element 335) when State2 can be active, and ADD2 (element 325) to write to R5 (element 335) when either State3, State4, or State5 can be active. It can also prevent MUL5 and ADD2 from writing to R5 when either State1 or State6 can be active, as these state signals may not be driving the selection logic.

Exemplary ESL (One-Hot State Signal) Constraint 4

At most, for example, one state signal can be active in any clock cycle. Sometimes, there can be clock cycles with no read/write operations performed. In these exemplary clock cycles, none of the state signals can be active. In addition, each state signal should be active in at least one clock cycle. Example 5: Table IC illustrates this observation.

Public information about the target IC (e.g., from datasheets) can be used to determine the schedule length (e.g., latency), input arrival time, and output departure time.

Exemplary ESL (Input Arrival) Constraint 5

If an input arrives at clock cycle 0, then at least one of the operators connected to that input register should perform an operation using this input. Otherwise, no computation can be performed, and the clock cycle can be wasted. This condition can hold true only for the inputs arriving at the first clock cycle. At any other clock cycle, computations involving intermediate results, which can be independent of the input arriving at that clock cycle, can take place. Example 6: Input X arrives at clock cycle 0 as shown in FIGS. 2C and 2D, and can be stored in R1. Operators MUL1 and ADD2 can read the contents of R1. Thus, at least one of these operators must compute in clock cycle 1. As shown in FIG. 2C, MUL1 can compute operation M3 in the first clock cycle.

Exemplary ESL (Output Departure) Constraint 6

If the output of the design can be ready in clock cycle c, then it should have been written into the output register in clock cycle c by at least one of the operators connected to that output register. Example 7: Output Y arrives at cycle 6 into register R5 as shown in FIGS. 2C and 2D. Thus, an attacker can consider that either MUL5 or ADD2 must have written to R5 in clock cycle 6. In fact, ADD2 can write the result of operation A4 as listed in Table IA and Table IB.

Exemplary ESL (Latency) Constraint 7

If an operator with latency L reads operands at clock cycle i, it can write its output at clock cycle i+L. A non-pipelined operator with latency L receiving an input at clock cycle c cannot accept any inputs between clock cycles c+1 through c+L−1. Example 8: Consider the operator MULL with a latency of 2 clock cycles shown in FIG. 2D. It reads its operands at the beginning of clock cycle 1 to perform M3, and can produce the output at the beginning of clock cycle 3 (=1+2). Therefore, it cannot accept any inputs in clock cycle 2.

In step 4 of the attack, the attacker can model these ESL constraints as SAT formulae, and can solve them. The attacker can then determine which state signal can be active at which clock cycle(s), and recover the next-state logic. In step 5, the attacker can stitch the recovered next-state logic with the controller output logic and the datapath to recreate a design that can be functionally equivalent to the original design.

Exemplary Security Metric: Number of CDFGs

In order to recover the original CDFG, or its functional equivalent, an attacker can be forced to explore the search space of all possible CDFGs as the attacker does not have any information about the controller. Thus, the size of the attacker's search space, for example, can be the number of CDFGs, which can be used as the security metric. An attacker can use the proposed ESL constraint to prune this search space.

The number of CDFGs can be determined using a graph-theoretic formulation. Consider an ESL-generated design that has N components (e.g., a component can be an operator, an input port or an output port) with a schedule length SL. This exemplary design can be represented as a Super-CDFG. In the SuperCDFG, a vertex can be created for each component at every clock cycle (e.g., including clock cycle 0). Vertex vcp;clk can correspond to component cp at clock cycle clk. Thus, there can be N×(SL+1) vertices. In the SuperCDFG, each directed edge ($v_{cp;clk}$, $v_{cp';clk'}$) can correspond to the data transfer from the output of component cp at clock cycle clk to an input of component cp' at clock cycle clk' where clk'>clk.

The goal of an attacker can be restated in terms of SuperCDFG as follows. First, recover the original CDFG, or its functional equivalent, from the SuperCDFG. In the considered threat model, the attacker knows the SuperCDFG as the attacker knows the components, and the schedule length of the target design. But, the attacker does not know which edges and vertices to eliminate, and which to retain, in order to recover the original CDFG, or its functional equivalent. Consequently, the number of CDFGs can be large. However, this search space can be pruned by using ESL constraints.

Exemplary Number of CDFGs on Using ESL Constraint 1 (Datapath)

To determine the number of CDFGs using ESL constraint 1, the number of possible operations performed by a component can be determined. This can be obtained as the product of the number of possible times a component can be used and the number of possible sets of its inputs.

The number of possible times a component can be used can be derived as follows. Let $cp_{max}$ and $cp_{min}$ be the maximum number and minimum number of times a component can be used. The number of times a component can be used can be limited by the schedule length of the design. Thus, $cp_{max}=SL$. The minimum number of times a component can be used can be equal to the maximum number of wires arriving at its input port because the component has to read its inputs from each of these wires. Thus, $cp_{min}=cp_{maxIpNum}$, where $cp_{maxIpNum}$ can be the maximum number of wires arriving at an input port of component cp. The number of possible times component cp can be used can be, for example:

$$\sum_{i=1}^{SL-cp_{maxIpNum}} \binom{SL}{i}.$$

The number of possible sets of inputs for the component cp can be derived as follows. Let $cp_{input,x}$ be the number of wires connecting to input x, and $cp_{input}$ be the number of inputs of a component cp. At every clock cycle, input x of cp can receive its value from one of the wires connected to it. The number of possible sets of inputs for cp at each clock cycle can be, for example:

$$\Pi_{i=1}^{cp|input|} cp_{|input,i|}.$$

The number of possible operations performed by component cp can be, for example:

$$\sum_{i=1}^{SL-cp_{maxIpNum}} \binom{SL}{i} \times \Pi_{i=1}^{cp|input|} cp_{|input,i|}.$$

The number of CDFGs that need to be explored on using ESL constraint 1 can be the product of the number of possible operations performed by all N components in the exemplary design. When using ESL constraint 1, # of $$CDFGs \leq \Pi_{cp=1}^{N} \left( \sum_{i=1}^{SL-cp_{maxIpNum}} \binom{SL}{i} \times \Pi_{i=1}^{cp|input|} cp_{|input,i|} \right).$$

This can be the upper bound on the number of CDFGs as this formulation may not consider the cases where functionally equivalent CDFGs can be extracted from the SuperCDFG leveraging the associativity, distributivity and commutativity properties of the components.

Exemplary Number of CDFGs on Using ESL Constraints 1-4 (Datapath+Controller Output Logic+State Signals):

When the output logic of the controller of an ESL-generated design can be unprotected, the attacker can identify the set of edges that can emanate from the vertices representing the same clock cycle. For each set of edges, the attacker has to select the values of clk and clk' $\in [0, SL]$ where clk'>clk. According to ESL constraint 4, only one set of data transfers can happen in a clock cycle. Thus, only one set of edges can emanate from the vertices representing the same clock cycle. This can reduce the upper bound on the number of CDFGs. On using ESL constraints 1-4, # of $$CDFGs \leq \left\lceil \frac{SL^2}{2} \right\rceil !$$

Exemplary Number of CDFGs on Using ESL Constraints 1-6 (Datapath+Controller Output Logic+State Signals+Input Arrival+Output Departure):

For example, it can be assumed that all inputs can arrive at the same clock cycle, and all outputs can depart at the same clock cycle. These clock cycles can be known to the attacker through the design datasheet. On using ESL constraints 1-6, $$CDFGs \leq \left\lceil \frac{(SL-1)^2}{2} \right\rceil$$

Exemplary Number of CDFGs on Using ESL Constraints 1-7 (Datapath+Controller Output Logic+State Signals+Input Arrival+Output Departure+Latency):

The latency constraint can yield the values of clk and clk' based on the latency of the operators used in each clock cycle. Using constraint 5, an attacker can determine the operators used in the first clock cycle. From the latency of these operators, the attacker can identify the set of edges emanating from the corresponding vertices in the Super-CDFG. Consequently, the vertices at which they terminate in the subsequent clock cycles can be determined. The attacker can iteratively identify the set of edges emanating from the vertices in the other clock cycles. This can further decrease the upper bound on the number of CDFGs. When using ESL constraints 1-7, # of CDFGs$\leq$(SL-2).

Figure 4A:
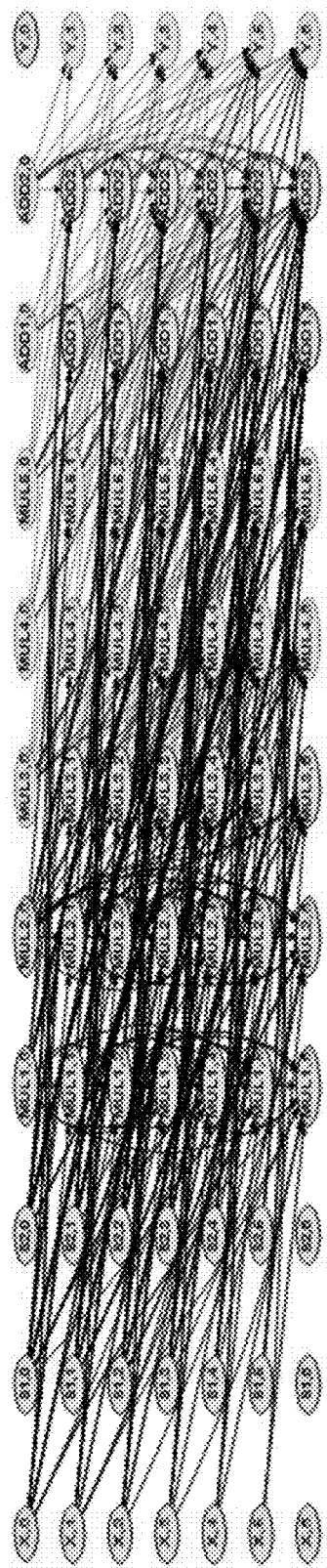
FIG. 4A is a diagram illustrating a SuperCDFG of a Biquad filter using ESL constraint 1 according to an exemplary embodiment of the present disclosure.
Figure 4B:
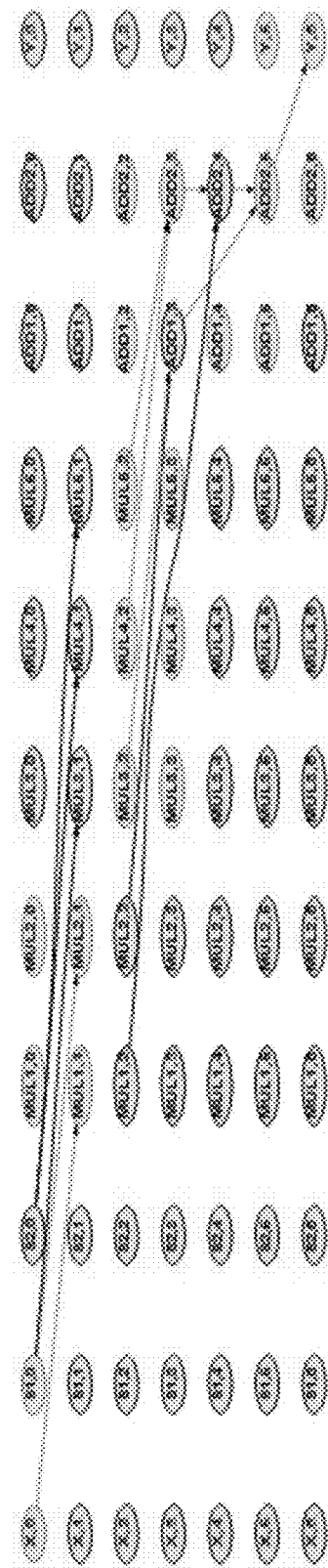
FIG. 4B is a diagram illustrating the SuperCDFG using ESL constraints 1-7 according to an exemplary embodiment of the present disclosure.

The number of CDFGs can be exponential in the SL of the design when only ESL constraint 1 can be used. However, when ESL constraints 1-7 can be used, the number of CDFGs can become linear in SL. From an attacker's perspective, the upper bound on the number of CDFGs can be important because the attack will always be practical and successful when the upper bound can be small. Example 9: FIG. 4A shows the SuperCDFG for BQF on incorporating different sets of ESL constraints. For BQF, on using ESL constraint 1, the upper bound on the number of CDFGs can be $\leq 2^{53}$. However, on using ESL constraints 1-7, the upper bound on the number of CDFGs can decrease to 4. However, there can be only one CDFG that can satisfy ESL constraints 1-7, which can be determined by solving the SAT formula of the constraints.

Figure 2E:
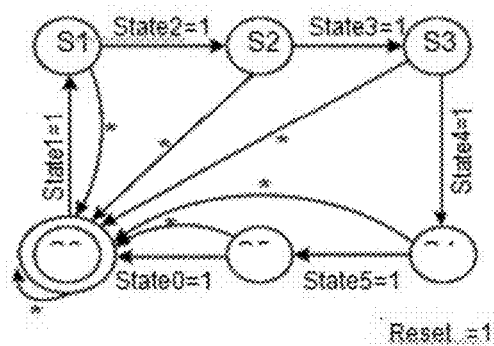
FIG. 2E is a diagram of a finite state machine according to an exemplary embodiment of the present disclosure.

Exemplary Results
Exemplary Experimental Configuration
Exemplary Baseline Designs:

The exemplary controller recovery attack can be demonstrated on three state-of-the-art academic ESL tools (e.g., FIG. 2A) and two state-of-the-art industry ESL tools (e.g., FIGS. 2D and 2E). C descriptions of the designs (see, e.g., References 33 and 34) were converted into CDFGs and were synthesized using the default setup of ESL tools without resource constraints (e.g., designs were synthesized assuming the availability of an unlimited number of operators) and were non-pipelined (e.g., their inputs arrive at a frequency equal to their schedule length). The next-state logic of the controller can be hardened using state-of-the-art RTL hardening procedures. (See, e.g., References 25-27 and 31). The resulting RTL netlist was synthesized using Cadence RTL Compiler. (See, e.g., Reference 35). These can be referred to as baseline designs.

Controller Recovery Attack:

The exemplary 5-procedure controller recovery attack can function as follows:

1) The operators in the resultant design were identified through component matching (see, e.g., Reference 32);
2) A structural analysis can be performed to identify the connectivity among the components;
3) Based on the connectivity information, and the operators used in the design, SAT formulae for different ESL constraints were derived;
4) The CDFG of the hardened design was identified by solving this SAT formulae using PicoSAT (see, e.g., Reference 36);
5) The recovered CDFG was synthesized and stitched with the datapath to generate the recovered design.

Exemplary Validation Method

Synopsys Formality equivalence checker (see, e.g., Reference 37) was used to check the functional equivalence between the ESL-generated design from the original CDFG and the design generated from the CDFG recovered by the attacker. This checker can use compare points for equivalence checking across multiple clock cycles. A compare point in the design with the original CDFG can match the one in the design with the recovered CDFG, if the Boolean logic driving those compare points can be functionally equivalent. The output ports of the designs were used as compare points. A recovered design can be functionally equivalent to the original design only when all compare points match.

Exemplary Benchmarks

For example, 14 ESL benchmarks can be used that can be traditionally used to evaluate ESL tools (see, e.g., Reference 15): BQF, Arai, Dir, Feig dct, Lee, Pr, Wang, Chem, Honda, Mcm, Snow3G, Kasumi, MD5c and AES. BQF can implement an infinite impulse response filter, and the next six designs can be different procedures to implement an 8-point discrete cosine transform. (See, e.g., References 38 and 39). Chem is a chemical plant controller. Honda and Mcm is a digital signal processing procedures. (See, e.g., Reference 33). AES, Kasumi and Snow3g can be encryption procedures. (See, e.g., Reference 34). MD5c can be a message digest procedure. These benchmarks can be evaluate state-of-the art ESL procedures. (See, e.g., References 40 and 41). Table II lists the number of operations and edges in the CDFG, latency, and the number of gates in the non-pipelined designs for each benchmark. In AES, Kasumi and Snow3G, the ESL tools generated the Sboxes using logic gates, instead of look-up tables, because of their default configuration. Thus, these exemplary designs can use a large number of operators, and can have a large number of gates and clock cycles.

Exemplary Effectiveness of the Controller Recovery Attack

Table III lists the effectiveness of the controller recovery attack on ESL-generated designs. Columns 2 and 3 in Table III show the number of compare points for each design, and the percentage of compare points that pass the equivalence check, respectively. All compare points passed equivalence checking. The reverse engineered design can be functionally equivalent to the original design for all benchmarks synthesized using all ESL tools. Thus, all ESL tools can be vulnerable. Columns 5 and 6 in Table III show the number of literals in the SAT formula, and the time used to solve the formula. The SAT formula for most of the designs was solved within a few seconds. In large designs (e.g., Kasumi and AES), the SAT solver took several minutes. Similarly, the effectiveness of the controller recovery attack was analyzed using Tool A when the designs were fully pipelined. Results shown in Table IV are similar to those in Table III.

Exemplary Bounds on the Number of CDFGs

Table V shows the number of CDFGs when attacking a hardened ESL-generated design (e.g., design with only the next state logic of controller protected). Columns 2-5 show the upper bound on the number of CDFGs when an attacker uses different ESL constraints. The upper bound on the number of CDFGs when using ESL constraint 1 can be very high (e.g., greater than or equal to $2^{300}$). However, when all ESL constraints can be considered, the upper bound on the number of CDFGs can dramatically decrease to (e.g., $\leq 2^9$), making it easy for an attacker to search for the CDFG. However, not all of these CDFGs can satisfy ESL constraints 1-7; only the original CDFG, or its functional equivalent, can satisfy the constraints. The upper bound may only limit the search space for an attacker. Since the upper bound can be relatively small (e.g., $\leq 2^9$), the SAT solver identified the correct CDFG in a few seconds.

Exemplary Thwarting Controller Recovery Attack

Operators can be essential to execute operations, and registers can be essential to store results. Relaxing ESL constraint 1 can result in an incorrect implementation. Thus, constraint 1 cannot be eliminated. Not imposing ESL constraint 2 can enable multiple operators to write to the same register in the same clock cycle, or can enable an operator input to read from multiple operands in the same clock cycle. This can introduce race conditions, which can lead to erroneous computations. Although ESL constraints 5-7 could be relaxed, an attacker could obtain the timing related information (e.g., latency of operators, input arrival time, output departure time, etc.) from the design data sheet. Thus, relaxing these constraints may not be useful.

When ESL constraints 3-4 can be relaxed, the number of CDFGs can increase because, for example:

1) Relaxing ESL constraint 3 can hide the relationship between the state signals and the multiplexer select signals; and
2) Relaxing ESL constraint 4 can break the one to-one correspondence between the clock cycles and the state signals.

Moreover, relaxing these constraints may not result in an incorrect design, thereby ensuring the functional correctness of ESL-generated designs.

Exemplary Basic Defense: Harden the Controller Output Logic

Hardening the controller output logic of an ESL-generated design can prevent an attacker from uncovering the relationship between the select signals and the state signals. Combinational logic obfuscation can be suitable for hardening the controller output logic. (See, e.g., References 42 and 43). In combinational logic obfuscation, additional logic gates can be introduced to conceal the functionality of the design. Only on applying the "key" to the inputs of these gates can, the design becomes functional; otherwise, it can remain non-functional. When the controller output logic can be hardened, and thus protected, the attacker can neither group a set of read/write operations (e.g., invalidating ESL constraint 3), nor infer that they happen at the same clock cycle (e.g., invalidating ESL constraint 4).

Figure 5A:
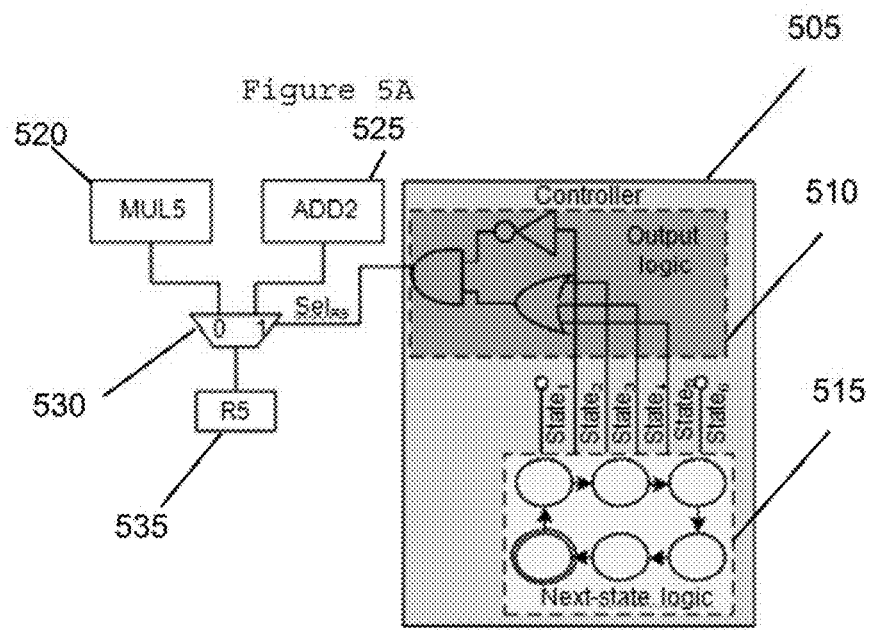
FIG. 5A is a schematic of a hardened selection logic for register R5 according to an exemplary embodiment of the present disclosure.

Example 10: FIG. 5A shows a schematic of the fully hardened Controller 505 for BQF (e.g., both the Output Controller Logic 510 and Next State Logic 515 can be hardened), as per basic defense. Consider State2 which can control the select signal of R5 ("SelR5") (e.g., element 535). For example, when the Output Controller Logic 510 can be unprotected, an attacker can determine that SelR5 can be 0 when State2 can be active. Consequently, the attacker can know that MUL5 (element 520) can be writing (to a component-element 530) to R5 (element 535). However, when the Output Controller Logic 510 can be hardened, this relationship between State2 and SelR5 cannot be determined. Thus, the attacker would not know whether MUL5 (element 520) or ADD2 (element 525) can be writing (to a component-element 530) to R5 (element 535) when State2 can be active, thereby resulting in two different CDFGs: one in which MUL5 writes to R5 when State2 can be active, and the other in which ADD2 writes to R5 when State2 can be active.

Exemplary Impact on the Security Metric

To quantify the hardness of the defense, the number of CDFGs can be used as the security metric. This metric for basic defense can be determined as follows. When the output logic of the controller can be hardened, the number of CDFGs can depend only on the number of possible sets of inputs of every component in the design. This can be because the attacker can use the ESL constraints to obtain information about the latency of the components, input arrival time, and output departure time from the design datasheet. The number of possible sets of inputs of a component cp can be $\Pi_{i=1}^{cp_{|input|}} cp_{|input,i|}$. Consequently, the number of CDFGs, when using a basic defense, can be the product of the number of possible sets of inputs of each of its N components. On using basic defense, # of CDFGs$\leq \Pi_{cp=1}^{N} \Pi_{i=1}^{cp_{|input|}} cp_{|input,i|}$

In order to eliminate the decrease in the number of CDFGs due to the associativity, distributivity and commutativity properties of the components, only the components that perform different types of computation can be considered. Thus, for a design with K types of components, # of CDFGs$\geq \Pi_{cp=1}^{K} \Pi_{i=1}^{cp_{|input|}} cp_{|input,i|}$.

Two important shortcomings of this basic defense can be, for example:
1) The different parameters of an ESL-generated design (e.g., N, $cp_{input}$, $cp_{input,i}$) may not be sufficient to achieve the desired number of CDFGs as the ESL tools do not consider security as a design parameter. The results can indicate that the number of CDFGs provided by basic defense in many benchmarks can be less than the target security level ($2^{128}$), failing to provide a reasonable amount of security; and
2) Basic defense does not protect all operations. For example, an attacker can deduce that MUL1 reads the input value X from register R1 in clock cycle 1 because of ESL input arrival constraint 5. The attacker will also know that the second input to MUL1 reads from constant register K1 in clock cycle 1 as it can be the only register connected to that input. Consequently, the attacker knows that operation M3 happens in clock cycle 1. The results can show that an attacker can identify the operations that can compute on average 19% of the outputs bits (e.g., compare points) in the designs reinforced with basic defense.

Exemplary Enhanced Defense: Add Decoy Connections

In order to increase the number of CDFGs, decoy connections can be added among the input registers and operators of different types, in addition to hardening the controller output logic. This can be because decoy connections do not reveal which subset of operators that can be connected to the input registers can actually be used in clock cycle 1.

Figure 5B:
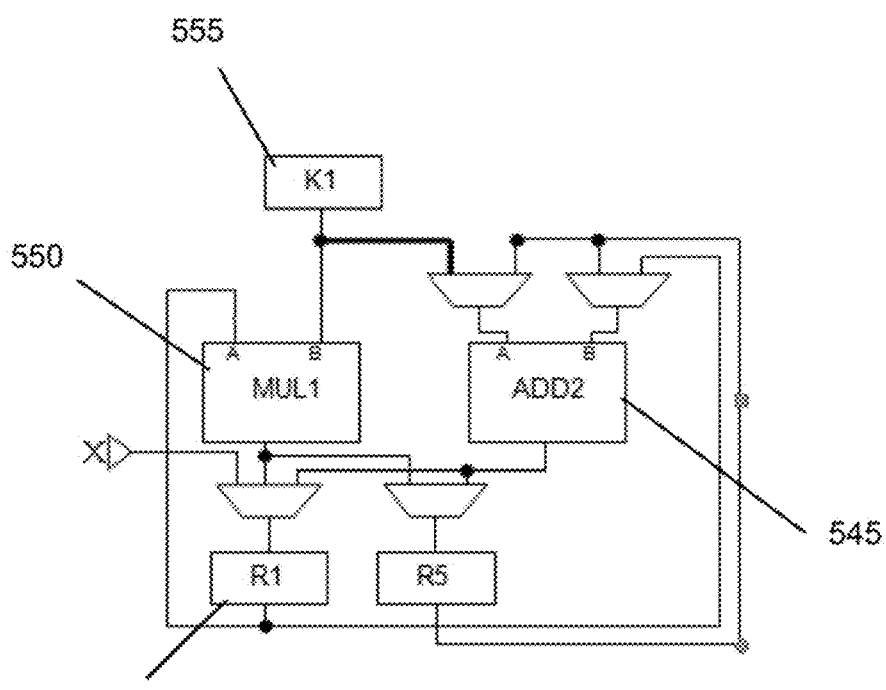
FIG. 5B is a schematic of an enhanced defense logic which can provide ambiguity in the first clock cycle according to an exemplary embodiment of the present disclosure.

Example 11: As shown in FIG. 5B, R1 (element 540) can be connected to an input of ADD2 (element 545). The number of CDFGs can be increased by connecting K1 (element 555) to the other input of ADD2 (element 545). This can be a decoy connection. An attacker now encounters the following possibilities: (i) both MUL1 (element 550) and ADD2 (element 545) can be used in clock cycle 1, (ii) only MUL1 (element 550) can be used in clock cycle 1, and (iii) only ADD2 (element 545) can be used in clock cycle 1.

Decoy connections between the outputs (e.g., the registers) of the operators and the inputs of those operators can increase the number of CDFGs in two ways. First, any of the decoy connected operators can be used. Second, the inputs to these operators can be any of the results generated in previous clock cycles.

Figure 5C:
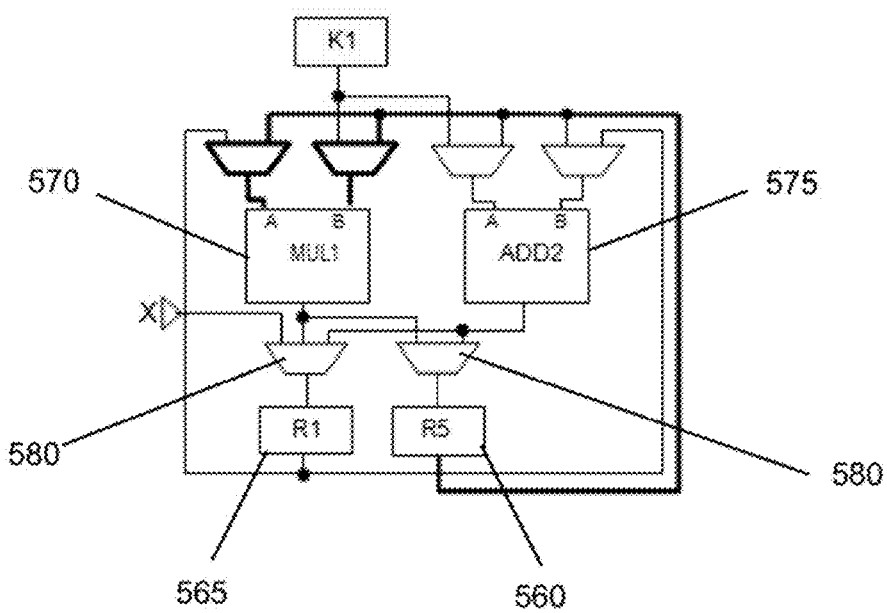
FIG. 5C is a schematic of the enhanced defense logic which can provide ambiguity in all clock cycles according to an exemplary embodiment of the present disclosure.

Example 12: FIG. 5C shows a schematic of the decoy connections between R5 (element 560) and inputs of MUL1 (element 570). Multiplexers 580 can be added at the inputs of MUL1 (element 570) so that they can read from both R5 (element 560) and R1 (element 565). Since R5 (element 560) and R1 (element 565) can hold the results of the operations executed in the first clock cycle, both MUL1 (element 570) and ADD2 (element 575) could read these registers and compute in any clock cycle. This can create an ambiguity for an attacker in every clock cycle.

Arbitrarily connecting operators and registers does not necessarily increase the number of CDFGs as the attacker can reduce the search space upon identifying some of the decoy connections. The following can be a set of rules to ensure that the decoy connections increase the number of CDFGs.

Exemplary Rule 1:
Each operator in the decoy connection network should be of a different type. If these operators can be of the same type, some of the possible combinations can then fortuitously yield functionally equivalent designs because of the associative and distributive properties of these operators. ESL design tools do support operators of different types such as signed and unsigned adders, multipliers, subtracters and square root units.

Exemplary Rule 2:
The number of decoy-connected registers should not be less than the number of decoy-connected operators. Otherwise, an attacker could prune the operators connected by decoy connections but do not have any registers to write to.

Exemplary Rule 3:
An operator should be able to write to any of the decoy-connected registers. If an operator writes to only a subset of the decoy-connected registers, an attacker can then use this as a hint. The attacker can correctly infer that the remaining registers might not store valid results in that clock cycle. Thus, the operators writing into these registers need not be considered.

Exemplary Rule 4:
Each input of an operator should be able to read from any of the decoy-connected registers, increasing the number of possible sets of inputs for an operator. This can increase the number of CDFGs.

Exemplary Impact on the Security Metric:
Since the decoy connections can connect the output of each component to every input of every component, the number of sets of inputs for a component cp can be $cp_{|input|}^{N}$, where N can be the number of components. Thus, for a design with N components, # of CDFGs$\leq \Pi_{cp=1}^{N} cp_{|input|}^{N}$ In order to eliminate the decrease in the number of CDFGs due to the associativity, distributivity and commutativity properties of the components, only the components that perform different types of computation can be considered. Thus, when decoy connections can be introduced into a design with K types of components # of CDFGs$\leq \Pi_{cp=1}^{K} cp_{|input|}^{K}$.

From the defender's (e.g., designer's) perspective, an ESL-generated design can be considered secure only if the lower bound on the number of CDFGs can be greater than the target security level (e.g., $2^{128}$). If this lower bound can be less than the target security level, then one should add decoy operators of different types. In order to achieve this target security level, the minimum number of different types of operators used in the decoy connection network can be 12 (e.g., assuming each operator has two inputs).

Exemplary Effectiveness of Basic and Enhanced Defenses

The designs generated by ESL Tool A were hardened with a basic defense and an enhanced defense. The controller recovery attack was then launched on these hardened ESL designs to determine the effectiveness of the defense procedures. Table VI lists the effectiveness of the basic defense in thwarting the controller recovery attack. First, the hardened design recovered by the attacker does not match the original design. Thus, all recovered designs "fail" equivalence checking. However, a careful observation of the recovered designs can reveal that on average about 19% of the outputs (e.g., compare points) in the recovered design can be functionally equivalent to their counterparts in the original design. This can be because an attacker can be still able to recover the operations that compute these outputs, as discussed above. Columns 4 and 5 of Table VI show the upper and lower bounds on the number of CDFGs while attacking the designs reinforced with basic defense. Even though the upper bound on the number of CDFGs for basic defense can be greater than the target security level (e.g., $2^{128}$) except for 7 out of 14 designs, the lower bounds of all designs can still be lower than the target security level. Only the lower bound can quantify the minimum effort used by an attacker. If this bound can be greater than the target security level, the attack will always be impractical. Since the lower bound for designs reinforced with basic defense can be less than the target security level, basic defense does not guarantee security.

Table VI lists the exemplary effectiveness of the enhanced defense in thwarting the controller recovery attack. First, the design with the recovered CDFG does not match the original design, which can be reinforced with enhanced defense. Thus, all recovered designs "fail" equivalence checking. Unlike a basic defense, none of the outputs in the reverse engineered design can be functionally equivalent to the corresponding output in the original design. Further, the lower bound on the number of CDFGs can be greater than or equal to $2^{144}$, delivering a higher security level than targeted.

Exemplary Overhead of Basic and Enhanced Defenses

Figure 6:
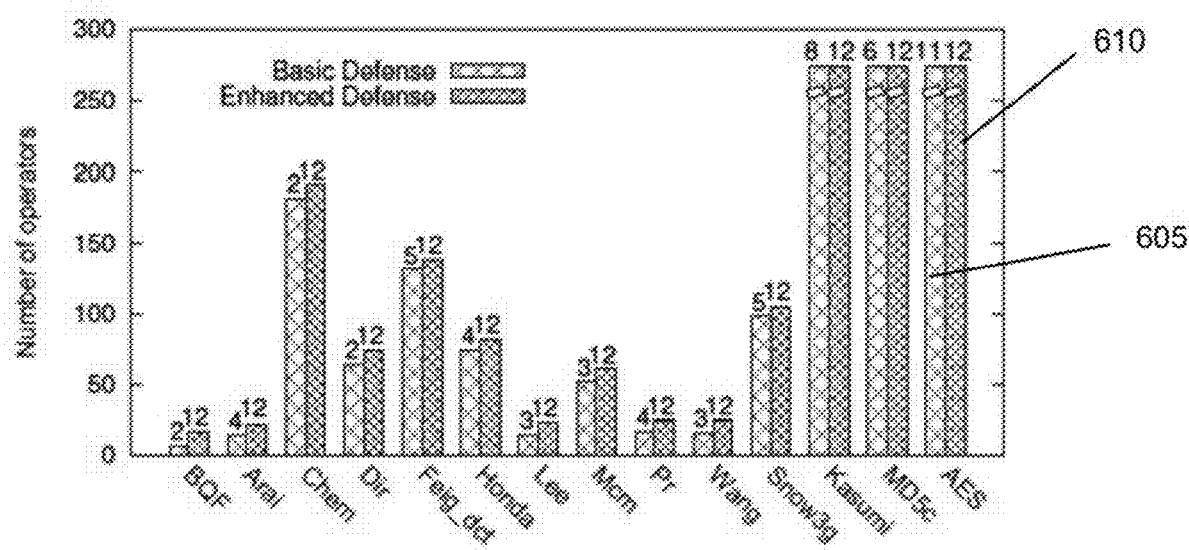
FIG. 6 is a graph illustrating the number of operators having a basic defense and the number of operators having an enhanced defense in an exemplary IC according to an exemplary embodiment of the present disclosure.

Number of Operators:

FIG. 6 is a graph illustrating the number of operators in the designs with Basic Defense 605 and in the designs with Enhanced Defense 610. The number on top of the bars of FIG. 6 indicates the number of different operator types in the design. The designs hardened using a basic defense have the same number of operators as the baseline designs. Thus, the basic defense has negligible overhead. However, it does not guarantee the desired level of security (e.g., greater than or equal to $2^{128}$).

In the case of the enhanced defense, it was determined that 12 operator types can be beneficial to increase the number of CDFGs to greater than or equal to $2^{128}$ using the lower bound for enhanced defense. For each benchmark, the design was generated using ESL tool A, and determined the number of types of operators in the design. If the number of types of operators can be less than 12, operators of different types can be added in the decoy connection network. While operators can be added, the percentage increase in the number of operators can be less than 3% (e.g., except for designs having less than 10 operators such as BQF and Arai). In large designs, such as AES, Kasumi and MD5c, the percentage increase in number of operators can be less than about 0.01%. Thus, the enhanced defense can provide the target security level with only a small area overhead.

Exemplary Power, Area and Delay Overhead:

To determine the power, area, and delay overhead of the enhanced defense, the baseline designs, and the designs with enhanced defense for each benchmark, were synthesized using the Cadence RTL compiler (see, e.g., Reference 35) for 45 nm FreePDK library. (See, e.g. Reference 44). Table VII lists the overhead. For some of the designs, the power consumption reduces because of the decrease in switching activity caused by reduced operating frequency. The area overhead on average can be about 6.79%. For large designs, such as AES and Kasumi, the area overhead can be approximately 0% because only one extra operator can be used. The operators, multiplexers, registers and wires can be added for enhanced defense increase in the area. Multiplexers can increase the critical path delay as they can be on the inputs of the operators and registers. However, the average (e.g., excluding Arai) increase in delay can be less than about 5%. The overhead of the exemplary system, method and computer-accessible medium can be almost similar to the ones of the state-of-the-art procedures. Introducing black-hole can incur at most about 5% overhead in area and power (see, e.g., Reference 25), adding dummy state transitions can incur about 12% on average overhead in power and area (see, e.g., Reference 26), and adding dummy states can incur about 84% on average overhead in power. (See, e.g., Reference 31).

Exemplary Number of Different Operator Types Vs. Security Level Trade-Off:

The target security level was set to $2^{128}$, utilizing 12 types of operators in the decoy network. Table VIII lists the number of operator types in the decoy network for different security levels. When only the basic defense can be used, only AES and Kasumi can satisfy the target security level of $2^{32}$ (e.g., as shown in Column 4 of Table VI), highlighting the importance of the enhanced defense. The library of an ESL tool can contain the necessary number of operator types to achieve the security level needed. Only one of the ESL tools has 32 types of operators to achieve a security level of $2^{1024}$.

Exemplary Conclusion

An attacker can recover the controller generated by any state-of-the-art ESL tool, even though they can be protected by the state-of-the-art hardening procedures. The controller recovery attack can circumvent the hardened next-state logic in the controller by exploiting the ESL design methodology, the unprotected controller output logic and the datapath. The controller recovery attack can be independent of the ESL design tool. It does not make any assumptions about the scheduling, binding and allocation procedures that can be used by the designer as this information may not be available to the attacker. Still, the exemplary attack can be consistently successful across all benchmarks and ESL tools. The vulnerability in data-path dominated designs was shown to be about 80% of the designs generated using ESL tools can be datapath-dominated. (See, e.g., Reference 45).

Furthermore, in accordance with the threat model proposed in the state-of-the-art hardening procedures (see, e.g., References 25-27), it can be assumed that the attacker does not have access to golden input-output pairs. Consequently, the exemplary defense procedure can be tailored towards this scenario. The strength of the proposed defense when the attacker has access to golden input-output pairs should be evaluated. Due to the considered threat model, the success of the exemplary attack can also depend on the success of obtaining the gate-level netlist from the layout or the IC. However, if the attacker has access to the gate-level netlist, the proposed attack becomes easier. In another embodiment of the attack, the attacker can obtain the gate-level (e.g., hardened) netlist of the target from a rogue insider in the design house.

The basic defense does not necessarily ensure that the number of CDFGs meets the target security level (e.g., $2^{128}$). As listed in Table VI, the lower bounds of the number of CDFGs for all designs hardened using basic defense can be less than the target security level. An attacker can successfully retrieve on average about 19% of the output bits and the Boolean logic driving them. Thus, the basic defense alone can be insufficient. The enhanced defenses can ensure that the lower bound of the number of CDFGs can meet the target security level, as listed in Table VI. Furthermore, the enhanced defenses ensure that an attacker cannot retrieve any of the output bits and the Boolean logic driving them.

While the designer can protect the datapath and controller output logic using existing RTL hardening procedures, the power, delay and area overhead can be high (e.g., approximately 25%). (See, e.g., Reference 29). However, as can be seen from Table VII, decoy connections can incur approximately 6.7% area and approximately 5% delay overhead on average to provide the same level of security. Furthermore, the basic and enhanced defenses can be complementary solutions to the active metering and logic obfuscation procedures. Only when these exemplary procedures can be used altogether, can they provide a reverse engineering-resilient design. Furthermore, the exemplary defenses can be readily integrated into any state-of-the-art ESL tool.

Figure 7:
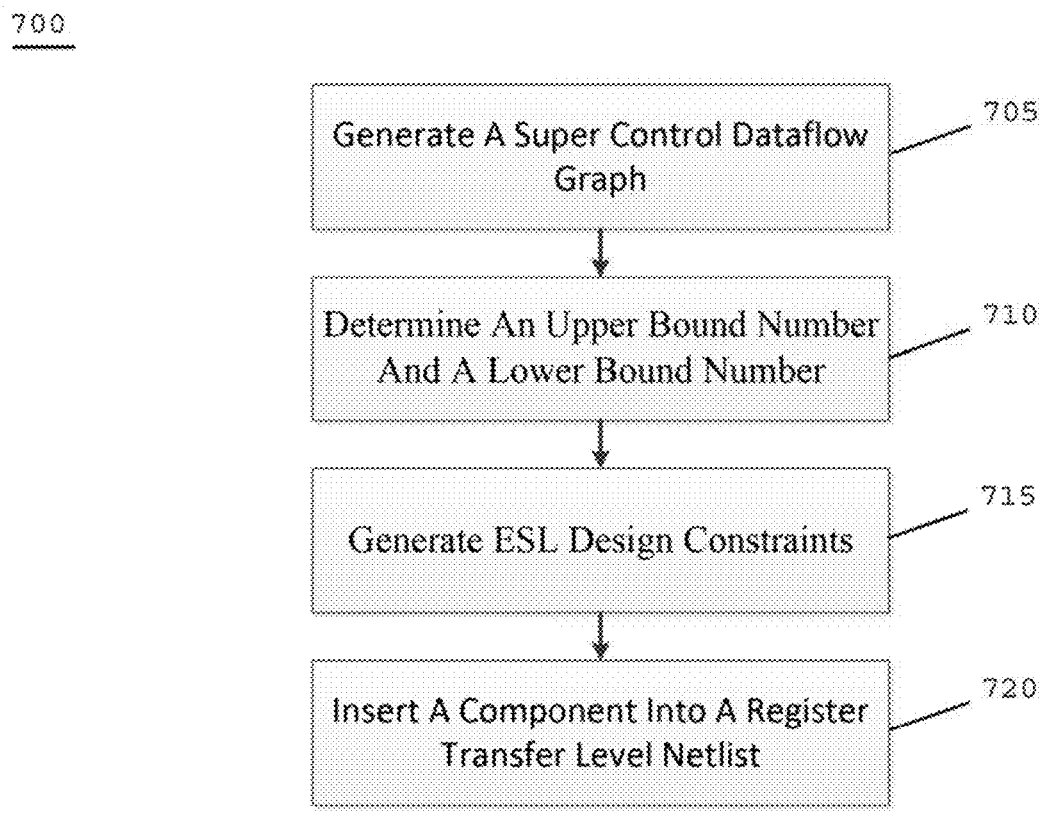
FIG. 7 is a flow diagram of an exemplary method for inserting a component into a RTL according to an exemplary embodiment of the present disclosure.

FIG. 7 shows a flow diagram of an exemplary method 700 for inserting a component into a register transfer level according to an exemplary embodiment of the present disclosure. For example, at procedure 705, one or more super CDFGs can be generated, by for example, applying ESL design constraints to the RTL netlist or based only on the netlist. At procedure 710, and upper bound number and a lower bound number can be determined based on a number of CDFGs in the super CDFGs or based on the netlist. At procedure 715, ESL design constraints can be generated, for example, based on a high-level synthesis apparatus. Finally, at procedure 720, a component can be inserted into the RTL netlist. For example, the component can be inserted into the RTL netlist such that the integrated circuit is further resilient to a reverse engineering attack.

Figure 8:
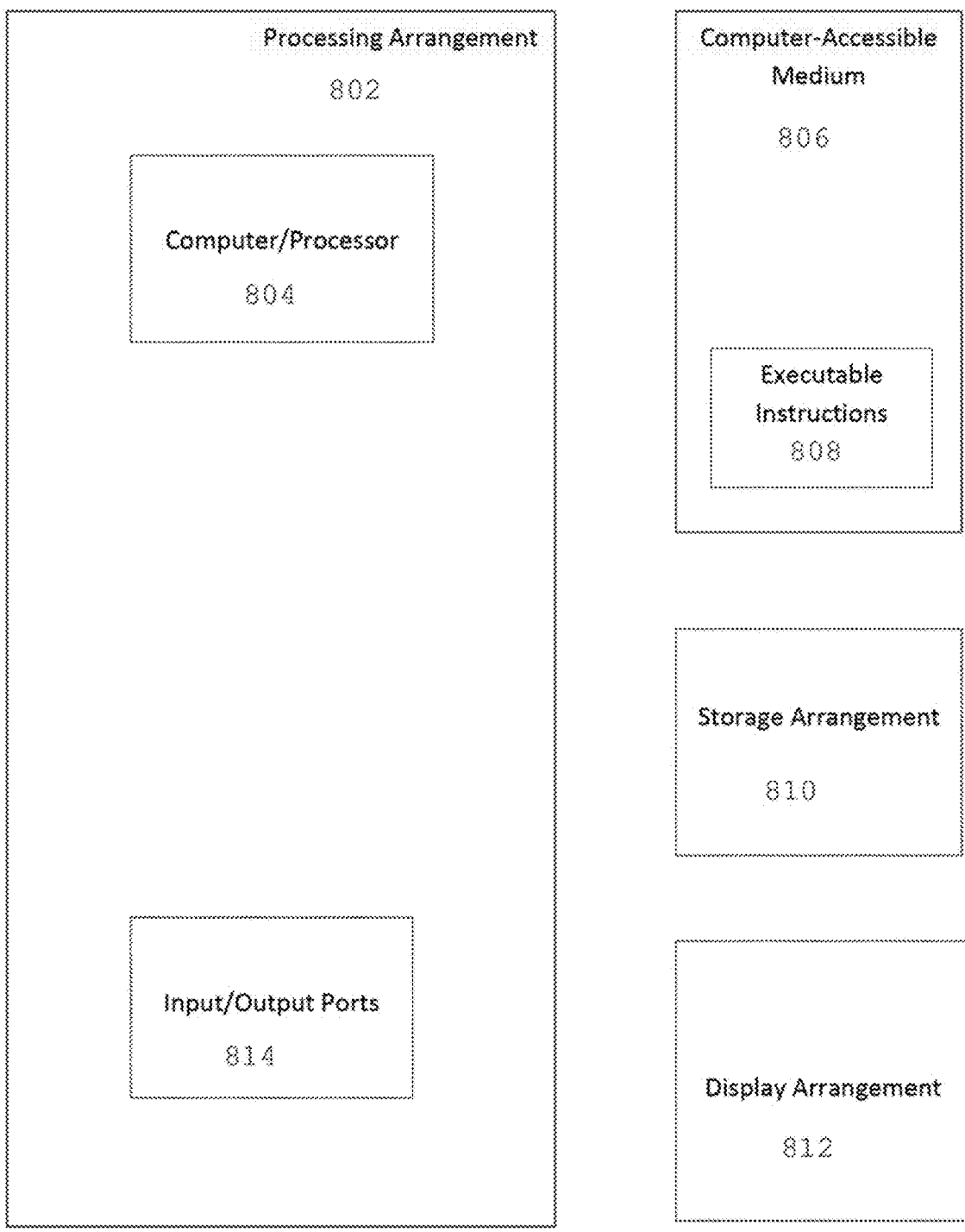
FIG. 8 is an illustration of an exemplary block diagram of an exemplary system in accordance with certain exemplary embodiments of the present disclosure.

FIG. 8 shows a block diagram of an exemplary embodiment of a system according to the present disclosure. For example, exemplary procedures in accordance with the present disclosure described herein can be performed by a processing arrangement and/or a computing arrangement 802. Such processing/computing arrangement 802 can be, for example entirely or a part of, or include, but not limited to, a computer/processor 804 that can include, for example one or more microprocessors, and use instructions stored on a computer-accessible medium (e.g., RAM, ROM, hard drive, or other storage device).

As shown in FIG. 8, for example a computer-accessible medium 806 (e.g., as described herein above, a storage device such as a hard disk, floppy disk, memory stick, CD-ROM, RAM, ROM, etc., or a collection thereof) can be provided (e.g., in communication with the processing arrangement 802). The computer-accessible medium 806 can contain executable instructions 808 thereon. In addition or alternatively, a storage arrangement 810 can be provided separately from the computer-accessible medium 806, which can provide the instructions to the processing arrangement 802 so as to configure the processing arrangement to execute certain exemplary procedures, processes and methods, as described herein above, for example.

Further, the exemplary processing arrangement 802 can be provided with or include an input/output arrangement 814, which can include, for example a wired network, a wireless network, the internet, an intranet, a data collection probe, a sensor, etc. As shown in FIG. 8, the exemplary processing arrangement 802 can be in communication with an exemplary display arrangement 812, which, according to certain exemplary embodiments of the present disclosure, can be a touch-screen configured for inputting information to the processing arrangement in addition to outputting information from the processing arrangement, for example. Further, the exemplary display 812 and/or a storage arrangement 810 can be used to display and/or store data in a user-accessible format and/or user-readable format.

The foregoing merely illustrates the principles of the disclosure. Various modifications and alterations to the described embodiments will be apparent to those skilled in the art in view of the teachings herein. It will thus be appreciated that those skilled in the art will be able to devise numerous systems, arrangements, and procedures which, although not explicitly shown or described herein, embody the principles of the disclosure and can be thus within the spirit and scope of the disclosure. Various different exemplary embodiments can be used together with one another, as well as interchangeably therewith, as should be understood by those having ordinary skill in the art. In addition, certain terms used in the present disclosure, including the specification, drawings and claims thereof, can be used synonymously in certain instances, including, but not limited to, for example, data and information. It should be understood that, while these words, and/or other words that can be synonymous to one another, can be used synonymously herein, that there can be instances when such words can be intended to not be used synonymously. Further, to the extent that the prior art knowledge has not been explicitly incorporated by reference herein above, it is explicitly incorporated herein in its entirety. All publications referenced are incorporated herein by reference in their entireties.

Exemplary Tables

TABLE IA (a)

| | | Operator | | | | | | |
|---|---|---|---|---|---|---|---|---|
| | | MUL1 | MUL2 | MUL3 | MUL4 | MUL5 | ADD1 | ADD2 |
| Clock cycle | 1 | M3 | M1 | M2 | M4 | M5 | — | — |
| | 2 | | | | | | — | — |
| | 3 | — | — | — | — | — | A1 | A2 |
| | 4 | — | — | — | — | — | — | A3 |
| | 5 | — | — | — | — | — | — | A4 |
| | 6 | — | — | — | — | — | — | — |

TABLE IB (b)
Register

| R1 | R2 | R3 | R4 | R5 |
|---|---|---|---|---|
| X | S1 | S2 | — | — |
| X | S1 | S2 | — | — |
| M3 | M1 | M2 | M4 | M5 |
| M3 | M1 | M2 | A1 | A2 |

TABLE IB-continued (b) Register

| R1 | R2 | R3 | R4 | R5 |
|---|---|---|---|---|
| M3 | M1 | M2 | A1 | A3 |
| M3 | M1 | M2 | A1 | Y(A4) |

TABLE IC (c) Control Signals

| $State_1$ | $State_2$ | $State_3$ | $State_4$ | $State_5$ | $State_0$ |
|---|---|---|---|---|---|
| 1 | 0 | 0 | 0 | 0 | 0 |
| 0 | 1 | 0 | 0 | 0 | 0 |
| 0 | 0 | 1 | 0 | 0 | 0 |
| 0 | 0 | 0 | 1 | 0 | 0 |
| 0 | 0 | 0 | 0 | 1 | 0 |
| 0 | 0 | 0 | 0 | 0 | 1 |

TABLE II

Benchmark designs

| | Design | CDFG Operations | CDFG Edges | Schedule Length (# of States) | # of gates |
|---|---|---|---|---|---|
| Signal processing | BQF | 9 | 14 | 6 | 1699 |
| | Arai | 36 | 61 | 9 | 4632 |
| | Chem | 332 | 516 | 16 | 43990 |
| | Dir | 113 | 178 | 9 | 18404 |
| | Feig_dct | 567 | 884 | 15 | 67371 |
| | Honda | 102 | 159 | 9 | 20482 |
| | Lee | 48 | 80 | 13 | 6460 |
| | Mcm | 94 | 149 | 9 | 13229 |
| | Pr | 52 | 81 | 10 | 8985 |
| | Wang | 48 | 80 | 10 | 8588 |
| Security | Snow3g | 98 | 131 | 7 | 5521 |
| | Kasumi | 655 | 984 | 326 | 71084 |
| | MD5c | 469 | 684 | 319 | 5622 |
| | AES | 3166 | 5025 | 293 | 234632 |

TABLE III

Effectiveness of the controller recovery attack on designs generated by ESL tools. Each output bit is a compare point.

Tools A, B, C, D & E: Non-pipelined and Resource-Constrained

| | Attack Success | | | Attack Cost | |
|---|---|---|---|---|---|
| Design | No. of compare points | % compare points matched | Equivalence checking | # of SAT literals | Time for solving SAT (s) |
| BQF | 16 | 100 | Pass | 1050 | 0.01 |
| Arai | 128 | 100 | Pass | 5166 | 0.02 |
| Chem | 240 | 100 | Pass | 2415264 | 43 |
| Dir | 128 | 100 | Pass | 131328 | 0.75 |
| Feig_dct | 1024 | 100 | Pass | 517545 | 5.17 |
| Honda | 144 | 100 | Pass | 191565 | 1.10 |
| Lee | 128 | 100 | Pass | 10374 | 0.05 |
| Mcm | 128 | 100 | Pass | 56160 | 0.35 |
| Pr | 128 | 100 | Pass | 12320 | 0.01 |
| Wang | 128 | 100 | Pass | 11520 | 0.04 |
| Snow3g | 32 | 100 | Pass | 27720 | 0.17 |
| Kasumi | 64 | 100 | Pass | 8090016 | 143 |
| MD5c | 128 | 100 | Pass | 2536050 | 32 |
| AES | 128 | 100 | Pass | 33353948 | 1321 |

TABLE IV

Effectiveness of the controller recovery attack on pipelined designs generated using ESL tool A. Each output bit is a compare point.

Tool A: Fully pipelined

| Design | No. of compare points | % compare points matched | Equivalence checking |
|---|---|---|---|
| BQF | 16 | 100 | Pass |
| Arai | 128 | 100 | Pass |
| Chem | 240 | 100 | Pass |
| Dir | 128 | 100 | Pass |
| Feig_dct | 1024 | 100 | Pass |
| Honda | 144 | 100 | Pass |
| Lee | 128 | 100 | Pass |
| Mcm | 128 | 100 | Pass |
| Pr | 128 | 100 | Pass |
| Wang | 128 | 100 | Pass |
| Snow3g | 32 | 100 | Pass |
| Kasumi | 64 | 100 | Pass |
| MD5c | 128 | 100 | Pass |
| AES | 128 | 100 | Pass |

TABLE V

Number of CDFGs for baseline design, which is calculated using the equations in Section III-C.

| | ESL Constraints | | | |
|---|---|---|---|---|
| Design | #1 | #1-#4 | #1-#6 | #1-#7 |
| BQF | $2^{53}$ | $2^{52}$ | $2^{33}$ | $2^{2}$ |
| Arai | $2^{246}$ | $2^{160}$ | $2^{118}$ | $2^{3}$ |
| Chem | $2^{3526}$ | $2^{717}$ | $2^{606}$ | $2^{4}$ |
| Dir | $2^{731}$ | $2^{160}$ | $2^{118}$ | $2^{3}$ |
| Feig_dct | $2^{3790}$ | $2^{606}$ | $2^{512}$ | $2^{4}$ |
| Honda | $2^{942}$ | $2^{160}$ | $2^{118}$ | $2^{3}$ |
| Lee | $2^{356}$ | $2^{421}$ | $2^{345}$ | $2^{4}$ |
| Mcm | $2^{716}$ | $2^{160}$ | $2^{118}$ | $2^{3}$ |
| Pr | $2^{319}$ | $2^{216}$ | $2^{160}$ | $2^{3}$ |
| Wang | $2^{321}$ | $2^{215}$ | $2^{160}$ | $2^{3}$ |
| Snow3g | $2^{383}$ | $2^{80}$ | $2^{53}$ | $2^{3}$ |
| Kasumi | $\geq 2^{1000000}$ | $2^{757749}$ | $2^{752363}$ | $2^{9}$ |

TABLE V-continued

Number of CDFGs for baseline design, which is calculated using the equations in Section III-C.

| | ESL Constraints | | | |
|---|---|---|---|---|
| Design | #1 | #1-#4 | #1-#6 | #1-#7 |
| MD5c | $\geq 2^{1000000}$ | $2^{722105}$ | $2^{717134}$ | $2^9$ |
| AES | $\geq 2^{1000000}$ | $2^{598662}$ | $2^{594179}$ | $2^9$ |

TABLE VI

Effectiveness of basic defense. Equivalence checking is performed between the reverse engineered design and the original design. CMP refers to compare points matched.

| | Basic defense | | | | Enhanced defense | | | |
|---|---|---|---|---|---|---|---|---|
| | | | # of CDFGs | | | | # of CDFGs | |
| ESL Tool A Design | Equ. check | % CPM | Lower bound | Upper bound | Equ. check | % CPM | Lower bound | Upper bound |
| BQF | Fail | 30.8 | $2^4$ | $2^{14}$ | Fail | 0 | $2^{144}$ | $2^{157}$ |
| Arai | Fail | 30.8 | $2^{12}$ | $2^{21}$ | Fail | 0 | $2^{144}$ | $2^{240}$ |
| Chem | Fail | 7.5 | $2^4$ | $2^{474}$ | Fail | 0 | $2^{144}$ | $2^{742}$ |
| Dir | Fail | 10.3 | $2^4$ | $2^{122}$ | Fail | 0 | $2^{144}$ | $2^{152}$ |
| Feig_dct | Fail | 30.6 | $2^{15}$ | $2^{1070}$ | Fail | 0 | $2^{144}$ | $2^{1238}$ |
| Honda | Fail | 12.9 | $2^{12}$ | $2^{201}$ | Fail | 0 | $2^{144}$ | $2^{478}$ |
| Lee | Fail | 30.8 | $2^9$ | $2^{74}$ | Fail | 0 | $2^{144}$ | $2^{250}$ |
| Mcm | Fail | 17.0 | $2^9$ | $2^{191}$ | Fail | 0 | $2^{144}$ | $2^{432}$ |
| Pr | Fail | 28.6 | $2^{12}$ | $2^{113}$ | Fail | 0 | $2^{144}$ | $2^{282}$ |
| Wang | Fail | 28.6 | $2^9$ | $2^{83}$ | Fail | 0 | $2^{144}$ | $2^{263}$ |
| Snow3g | Fail | 32.1 | $2^{15}$ | $2^{142}$ | Fail | 0 | $2^{144}$ | $2^{289}$ |
| Kasumi | Fail | 0 | $2^{56}$ | $2^{138}$ | Fail | 0 | $2^{144}$ | $2^{238}$ |
| MD5c | Fail | 0 | $2^{30}$ | $2^{64}$ | Fail | 0 | $2^{144}$ | $2^{172}$ |
| AES | Fail | 0 | $2^{110}$ | $2^{1633}$ | Fail | 0 | $2^{144}$ | $2^{1723}$ |

TABLE VII

Power, area and delay overhead of enhanced defense.

| Design | % inc. in power | % inc. in area | % inc. in delay |
|---|---|---|---|
| BQF | −54.0 | 8.0 | 5.0 |
| Arai | −17.4 | 33.5 | 45.2 |
| Chem | −28.5 | 13.4 | 9.7 |
| Dir | −2.8 | 2.0 | 0.8 |
| Feig_dct | −23.6 | 4.5 | 2.7 |
| Honda | 3.0 | 6.0 | 5.8 |
| Lee | −11.3 | 7.1 | 7.1 |
| Mcm | −8.5 | 4.7 | 3.1 |
| Pr | −9.5 | 4.1 | 1.0 |
| Wang | −19.6 | 1.8 | 4.7 |
| Snow3g | −2.1 | 10.0 | 4.6 |
| Kasumi | −0.2 | ~0 | 5.2 |
| MD5c | −0.1 | ~0 | 5.4 |
| AES | −0.1 | ~0 | 4.8 |

TABLE VIII

Number of operator types required in decoy network for different security levels.

| | Target security level | | | | | |
|---|---|---|---|---|---|---|
| | $2^{32}$ | $2^{64}$ | $2^{128}$ | $2^{256}$ | $2^{512}$ | $2^{1024}$ |
| # of operator types | 6 | 8 | 12 | 16 | 23 | 32 |

APPENDIX

SAT Formulation

TABLE IX

Notations used in SAT formulation

| Notation | Description |
|---|---|
| c | Clock cycle c |
| SL | Schedule Length |
| IN | Set of inputs |
| i | An element in set IN |
| $i_{arrival}$ | Arrival time of input i |
| OUT | Set of outputs |
| o | An element in set OUT |
| $o_{departure}$ | Departure time of output o |
| OP | Set of operators |
| op | An element in OP |
| $L_{op}$ | Latency of the operator op |
| R | Set of registers |
| r | An element in Reg |
| opR | Set of registers connected to output of operator op |
| $R_{op,l}$ | Set of registers read by input l of operator op |
| opL | Set of inputs for the operator op |
| $rOP,L$ | Set of inputs L of operators OP which are connected to register r |
| rOP | Set of operators OP which write to register r |
| iR | Input i is written to a set of register R |
| or | Output o is read from register r |
| STATE | Set of state signals |
| $State_i$ | A state signal in STATE |
| $State_{i,c}$ | Value of state signal $State_i$ in clock cycle c |
| $Sel_r$ | Combinational gates in the controller output logic of register r |
| $op\_lCtrlOutLogic$ | Combinational gates in the controller output logic of operator op's input l |
| $Write_{c,op,r}$ | At clock cycle c, operator op is writing to register r |
| $Read_{c,r,op,l}$ | At clock cycle i, register r is writing to input l of operator op |

TABLE IX-continued

Notations used in SAT formulation

| Notation | Description |
|---|---|
| Writec,Statei=0 | Set of write operations denied when Statec is 0 in clock cycle c |
| Writec,Statei=1 | Set of write operations allowed when Statec is 1 in clock cycle c |
| Readc,Statei=0 | Set of read operations denied when Statec is 0 in clock cycle c |
| Readc,Statei=1 | Set of read operations allowed when Statec is 1 in clock cycle c |

ESL (controller output logic) constraint 3: Let op_lCtrlOutLogic and Sel$_r$ be the Boolean functions representing the combinational gates in the controller output logic for register r and operator op's input l.

$$(\text{Write}_{c,r,op} \wedge \text{Sel}_r) \wedge (\neg \text{Write}_{c,r,op} \wedge \neg \text{Sel}_r) \forall c \in (1,SL); \forall r \in R; \forall op \in OP \quad (1)$$

$$(\text{Read}_{c,op,l,r} \wedge op\_l_{CtrlOutLogic}) \wedge (\neg \text{Read}_{c,op,l,r} \wedge op\_l_{CtrlOutLogic}) \forall c \in in(1,SL); \forall l \in op_L; \forall op \in OP; \forall r \in R \quad (2)$$

$$\text{State}_{i,c} \wedge ((\text{Read}_{c,j1} \wedge \text{Read}_{c,j2} \wedge \ldots \wedge \text{Read}_{c,j|ReadSTATEt-1|}) \wedge (\text{Write}_{c,j1} \wedge \text{Write}_{c,j2} \wedge \ldots \wedge \text{Write}_{j|Writec,STATEt-1|})) \wedge ((\neg \text{Read}_{c,k1} \wedge \neg \text{Read}_{c,k2} \wedge \ldots \wedge \neg \text{Read}_{k|Readc,STATEt-0|}) \wedge (\neg \text{Write}_{c,k1} \wedge \neg \text{Write}_{c,k2} \wedge \ldots \wedge \neg \text{Write}_{k|Writec,STATEt-0|})) \forall c \in (1,SL); \wedge \text{State}_i \in \text{State} \quad (3)$$

ESL (state signal) constraint 4:

$$(\text{State}_{i,1} \wedge \text{State}_{i,2} \wedge \text{State}_{i,3} \wedge \ldots \wedge \text{State}_{i,SL}) \forall i \in \text{State} \quad (4)$$

$$(\text{State}_{1,c} \wedge \neg \text{State}_{2,c} \wedge \neg \text{State}_{3,c} \wedge \ldots \wedge \neg \text{State}_{|STATE|,c}) \wedge (\neg \text{State}_{1,c} \wedge \text{State}_{2,c} \wedge \neg \text{State}_{3,c} \wedge \ldots \wedge \neg \text{State}_{|STATE|,c}) \wedge (\neg \text{State}_{1,c} \wedge \neg \text{State}_{2,c} \wedge \text{State}_{3,c} \wedge \ldots \wedge \neg \text{State}_{|STATE|,c}) \wedge \ldots \wedge (\neg \text{State}_{1,c} \wedge \neg \text{State}_{2,c} \wedge \neg \text{State}_{3,c} \wedge \ldots \wedge \text{State}_{|STATE|,c}) \forall c \in (1,SL) \quad (5)$$

ESL (input arrival) constraint 5: Let the tuple {[op$_j$, l$_1$], [op$_2$, l$_2$], ... [op$_n$, l$_n$]} be the set of operators and their inputs reading from the register r.

$$\text{Read}_{1,op_1,l_1,r} \vee \text{Read}_{1,op_2,l_2,r} \vee \ldots \vee \text{Read}_{1,op_n,l_n,r} \forall r \in I_R; \forall i \in IN|i_{arrival}=0 \quad (6)$$

ESL (output departure) constraint 6:

$$\text{Write}_{c,r,op_1} \vee \text{Write}_{c,r,op_2} \vee \ldots \vee \text{Write}_{c,r,op_{|OP|}} \forall r \in o_R; \forall o \in OUT|o_{departure}=c; \forall c \in (1,SL) \quad (7)$$

ESL (latency) constrain 7 for pipelined operators:

$$(\text{Read}_{c,op,1,r_1} \vee \text{Read}_{c,op,1,r_2} \vee \ldots \vee \text{Read}_{c,op,1,r_{|R,op,1|}}) \wedge (\text{Read}_{c,op,2,r_1} \vee \text{Read}_{c,op,2,r_2} \vee \ldots \vee \text{Read}_{c,op,2,r_{|R,op,2|}}) \wedge \ldots \wedge (\text{Read}_{c,op,|op_t|,r_1|R,op|,r1} \vee \text{Read}_{c,op,|op_t|,r_2|R,op|,r2} \vee \ldots \vee \text{Read}_{c,op,|op_t|,r_{|R,op|,r|R,op|}}) \wedge (\text{Write}_{c+l,op,r1} \vee \text{Write}_{c+l,op,r2} \vee \ldots \vee \text{Write}_{c+l,op,r_{|R,op|}}) \forall op \in OP; \forall c \in (1,SL) \quad (8)$$

ESL (latency) constraint 7 for non-pipelined operators:
$$(\text{Read}_{c,op,1,r_1} \vee \text{Read}_{c,op,1,r_2} \vee \ldots \vee \text{Read}_{c,op,1,r_{|R,op,1|}}) \wedge (\text{Read}_{c,op,2,r_1} \vee \text{Read}_{c,op,2,r_2} \vee \ldots \vee \text{Read}_{c,op,1,r_{|R,op,2|}}) \wedge \ldots \wedge (\text{Read}_{c,op,|op1|,r1} \vee \text{Read}_{c,op,|op1|,r2} \vee \ldots \vee \text{Read}_{c,op,|op1|,r_{|R,op1|}}) \wedge (\neg \text{Read}_{c,+1,op,1s1} \wedge \neg \text{Read}_{c+1,op,1,r_2} \wedge \ldots \wedge \neg \text{Read}_{c+1,op,1,r_{|R,op,1|}}) \wedge (\neg \text{Read}_{c+1,op,2,r1} \wedge \neg \text{Read}_{c+1,op,2,r2} \wedge \ldots \wedge \neg \text{Read}_{c+1,op,2,r}) \wedge \ldots \wedge (\neg \text{Read}_{c+1,op,|op_1|,r1} \wedge \neg \text{Read}_{c+1,op,|op1|,r2} \wedge \ldots \wedge \neg \text{Read}_{c+1,op,|op_1|,r1}) \wedge \ldots \wedge (\neg \text{Read}_{c+L-1,op,1,r2} \wedge \ldots \wedge \neg \text{Read}_{c+L-1,op,1,s}) \wedge (\neg \text{Read}_{c+L-1,op,2,r1} \wedge \neg \text{Read}_{c+L-1,op,2,r2} \wedge \ldots \wedge \neg \text{Read}_{c+L-1,op,2,r_{|rpp,2|}}) \wedge \ldots \wedge (\neg \text{Read}_{c+L-1,op,|opi|} \wedge \neg \text{Read}_{c+L-1,op,|opt.|r2} \wedge \ldots \wedge \neg \text{Read}_{c+L-1,op,|opt.|s|rops.1}) (\text{Write}_{c+L,op,s1} \vee \text{Write}_{c+L,op,r2} \vee \ldots \vee \text{Write}_{c+L,op,r2}) \forall op \in Op; \forall c \in (1,SL)$$

```
Input : Original netlist, SL, TargetP_recovery, OperatorLibrary
Output: Hardened netlist
numOp = Number of operators in the netlist;
numOpType = Number of types of operators in the netlist;
numOpInLibrary = Number of operators types in
    OperatorLibrary;
DecoyConnectGroup = NULL;
for i ← I to numOpType do
    |   OpType_i.SelectFlag = 0;
end
while # of CDFGs < Target# of CDFGs, do
    |   SelectedOpType = NULL;
    |   for i ← I to numOpType do
    |   |   if opType_i.SelectFlag == 0 then
    |   |   |   SelectOpType = opType_i;
    |   |   |   opType_i.SelectFlag = 1;
    |   |   |   break;
    |   |   end
    |   end
    |   if SelectedOpType != NULL then
    |   |   Add SelectedOp to DecoyConnectGroup;
    |   |   opType_i.SelectFlag = 1;
    |   |   numOpInLibrary-:
    |   end
    |   else if numOpInLibrary>0 then
    |   |   SelectedOp = A new operator type from
    |   |   OperatorLibrary;
    |   |   Add SelectedOp to DecoyConnectGroup;
    |   |   numOpInLibrary-:
    |   end
    |   else
    |   |   Exit("Not enough operators")
    |   end
    |   Connect operators in DecoyConnectGroup using Rules 1-4;
end
```

Procedure 1: Adding decoy connections.
Exemplary Procedure to Add Decoy Connections Procedure 1 iteratively adds decoy connections by trying every operator type exactly once until the target number of CDFGs is met. Otherwise, the procedure selects an unused operator type from the ESL tool library and adds decoy connections between this new operator and all the other previously decoy-connected operators. If the target security level is still not met upon consuming all the operator types in the library, the procedure terminates upon making the actual connections by following Rules 1-4.

EXEMPLARY REFERENCES

The following references are hereby incorporated by reference in their entireties:
[1] Cadence, "DAC 2012 Gary Smith EDA Kickoff: EDA and ESL Growth and Four Different Software Virtual Prototypes,".
[2] M. Volckmann and S. Balacco, "Electronic System Level (ESL) Tools: Global Market Demand Analysis,".
[3] B. Bailey, "Is high-level synthesis ready for prime time?".
[4] D, Parsley, "A return to EDA and a Renewed Commitment to High-Level Synthesis,".
[5] J. Long, B. Liu, S. Neuendorffer, J. Noguera, K. Vissers, and Z. Zhang, "High-Level Synthesis for FPGAs: From Prototyping to Deployment," *IEEE Transactions on Computer-Aided Design of Integrated Circuits and Systems*, vol, 30, no. 4, pp. 473-491, 2011.
[6] Xilinx, "Vivado Design Suite,".
[7] Synopsys, "Synphony C Compiler,".

[8] Calypto, "Catapult,".
[9] Cadence, "C-to-Silicon Compiler,".
[10] MentorGraphics, "Vista,".
[11] Forte, "Cynthesizer 5,".
[12] BlueSpec, "High Level Synthesis Tools,".
[13] Oasys, "High Level Synthesis Tools,".
[14] K. Wakabayashi, "C-based behavioral synthesis and verification analysis on industrial design examples," *in the Proc. of Asia and South Pacific Design Automation Conference*, pp. 344-348, 2004.
[15] D. D. Gajski, N. D. Dutt, A. C-H Wu, and S. Y. L. Lin, "High Level Synthesis: Introduction to Chip and System Design," *Kluwer Academic Publishers*, 1993.
[16] DIGITIMES Research, "Trends in the global IC design service market,".
[17] Intelligence Advanced Research Projects Activity, "Trusted Integrated Circuits Program,".
[18] "Defense Science Board (DSB) study on High Performance Microchip Supply,".
[19] "VS Alliance—IP Protection Development Working Group. The value and management of intellectual assets,".
[20] SEMI, "Innovation is at risk as semiconductor equipment and materials industry loses up to $4 billion annually due to IP infringement," 2008,
[21] M. Tehranipoor, H. Salmani, X, Zhang, X. Wang, R. Karri, J. Rajendran, and K. Rosenfeld, "Trustworthy Hardware: Trojan Detection and Design-for-Trust Challenges," *IEEE Computer*, vol. 44, no. 7, pp. 66-74, 2011.
[22] "Dangerous fakes" *Business Week*, 2008. [Online].
[23] KPMG, "Managing the risks of counterfeiting in the information technology," 2006,
[24] R. Torrance and D. James, "The state-of-the-art in semiconductor reverse engineering," *in the Proc. of IEEE/ACM Design Automation Conference*, pp. 333-338, 2011.
[25] Y. Alkabani and F. Koushanfar, "Active hardware metering for intellectual property protection and security," *in the Proc. of USE IX Security*, pp. 291-306, 2007.
[26] R. Chakraborty and S. Bhunia, "HARPOON: An Obfuscation-Based SoC Design Methodology for Hardware Protection," *IEEE Transactions on Computer-Aided Design of integrated Circuits and Systems*, vol. 28, no. 10, pp. 1493-1502, 2009.
[27] F. Koushanfar, "Provably Secure Active IC Metering Procedures for Piracy Avoidance and Digital Rights Management," *IEEE Transactions on Information Forensics and Security*, vol. 7, no. 1, pp. 51-63, 2012,
[28] J. L. Hennessy and D. A. Patterson, "Computer architecture: a quantitative approach," Morgan Kaufmann Publishers, 1996.
[29] J. Rajendran, Y. Pino, O. Sinanoglu, and R. Karri, "Security analysis of logic obfuscation," *in the Proc. of IEEE/ACM Design Automation Conference*, pp. 83-89, 2012.
[30] S. M. Kuo, B. H. Lee, and W. Tian, "Real-Time Digital Signal Processing: Implementations and Applications, 2nd Edition," Wiley & Sons Ltd, 2006.
[31] Y. Alkabani, F. Koushanfar, and M. Potkonjak, "Remote activation of ICs for piracy prevention and digital right management," *in the Proc. of the IEEE/ACM International Conference on Computer-Aided Design*, pp. 674-677, 2007.
[32] P. Subramanyan, N. Tsiskaridze, K. Pasricha, D. Reisman, A. Susnea, and S. Malik, "Reverse Engineering Digital Circuits Using Functional Analysis," *in the Proc. of IEEE/ACM Design Automation and Test in Europe*, pp. 1277-1280, 2013.
[33] M. Srivastava and M. Potkonjak, "Optimum and heuristic transformation procedures for simultaneous optimization of latency and through-put," *IEEE Transactions on Very Large Scale Integration Systems*, vol. 3, no. 1, pp. 2-19, 1995.
[34] "Synthesizable SystemC Benchmark Suite,".
[35] Cadence, "RTL Compiler,".
[36] "Picosat,".
[37] Synopsys, "Formality,".
[38] N. Ahmed, T, Natarajan, and K. R. Rao, "Discrete Cosine Transform," *IEEE Transactions on Communications*, vol. 23, no, 1, pp. 90-93, 1974.
[39] Y. Arai, T. Agui, and M. Nakadjima, "A Fast DCT-SQ scheme for images," *Transactions on IEICE*, vol. E71, no. 11, pp. 1095-1097, 1988.
[40] S. Dai, M. Tan, K. Hao, and Z. Zhang, "Flushing-enabled loop pipelining for high-level synthesis," *IEEE/ACM Design Automation Conference*, pp. 1-6, 2014.
[41] A. Mirhoseini, E, Songhori, and F. Koushanfar, "Idetic: A high-level synthesis approach for enabling long computations on transiently-powered ASICs," *IEEE International Conference on Pervasive Computing and Communications*, pp. 216-224, 2013.
[42] J. Roy, F. Koushanfar, and I. Markov, "EPIC: Ending Piracy of Integrated Circuits," *IEEE Computer*, vol. 43, no. 10, pp, 30-38, 2010.
[43] A. Baumgarten, A. Tyagi, and J. Zambreno, "Preventing IC Piracy Using Reconfigurable Logic Barriers," *IEEE Design and Test of Computers*, vol. 27, no. 1, pp. 66-75, 2010.
[44] NCSU, "FreePDK45nm library,".
[45] Cadence, "High-Level Synthesis Now Spans the Datapath-Control Spectrum,".

What is claimed is:

1. A non-transitory computer-accessible medium having stored thereon computer-executable instructions, wherein, when a computer arrangement executes the instructions, the computer arrangement is configured to perform procedures comprising:

(a) generating at least one super control dataflow graph (CDFG) by applying a plurality of synchronous electronic system level (ESL) design constraints associated with an integrated circuit, wherein the at least one super CDFG is a graphical representation of types of tasks executed on the integrated circuit, and wherein the at least one super CDFG includes datapath components;

(b) determining a target security level for the integrated circuit by determining (i) a number of times each of the datapath components is used, (ii) a number of times each of the datapath components produces a particular output, and (iii) a time period that each of the datapath components takes to produce the particular output:

(c) determining at least one lower bound number for a number of CDFGs in the at least one super CDFG, wherein each of the CDFGs includes a plurality of nodes and a plurality of edges, and wherein each of the plurality of nodes represents an operation of the integrated circuit, and each of the plurality of edges represents a data flow of the integrated circuit;

(d) determining if the at least one lower bound is equal to or greater than the target security level;

(e) modifying the at least one lower bound by inserting at least one component on non-clock paths of a register transfer level (RTL) netlist if the at least one lower bound is less than the target security level;

(f) determining if the modified at least one lower bound is equal to or greater than the target security level; and (g) repeating procedures (e) and (f) until the modified at least one lower bound is equal to or greater than the target security level.

2. The computer-accessible medium of claim 1, wherein the computer arrangement is further configured to generate the ESL design constraints based on at least one high-level synthesis apparatus.

3. The computer-accessible medium of claim 1, wherein the computer arrangement is further configured to generate the at least one super CDFG by applying the ESL design constraints to the RTL netlist.

4. The computer-accessible medium of claim 1, wherein the RTL netlist description includes a particular netlist description having at least one hidden controller.

5. The computer-accessible medium of claim 4, wherein the computer arrangement is further configured to generate the at least one super CDFG based on the particular netlist.

6. The computer-accessible medium of claim 4, wherein the computer arrangement is further configured to determine the at least one lower bound for the number of the CDFGs based on the particular netlist.

7. The computer-accessible medium of claim 4, wherein the computer arrangement is further configured to insert the at least one component on the non-clock paths of the particular netlist.

8. The computer-accessible medium of claim 7, wherein the computer arrangement is further configured to insert the at least one component on the non-clock paths of the RTL netlist such that the integrated circuit is further resilient to at least one reverse engineering attack.

9. The computer-accessible medium of claim 1, wherein the at least one lower bound for the number of the CDFGs is at least one metric of a capability of the integrated circuit to resist at least one reverse engineering attack.

10. The computer-accessible medium of claim 1, wherein the RTL netlist is a RTL netlist of a synchronous integrated circuit which includes the at least one datapath and at least one controller part.

11. The computer-accessible medium of claim 1, wherein the at least one component includes at least one dummy component.

12. The computer-accessible medium of claim 11, wherein the at least one dummy component includes at least one extra state in a finite state machine.

13. The computer-accessible medium of claim 12, wherein the at least one extra state is at least one of at least one unused state or at least one state with no outgoing transition.

14. The computer-accessible medium of claim 13, wherein the at least one state with no outgoing transition is at least one black-hole state.

15. The computer-accessible medium of claim 11, wherein the at least one dummy component includes at least one transition in a finite state machine.

16. The computer-accessible medium of claim 13, wherein the at least one transition is at least one invalid transition.

17. The computer-accessible medium of claim 1, wherein the at least one super CDFG is a plurality of super CDFGs, and wherein a number of super CDFGs is based on a graph-theoretic formulation.

18. The computer-accessible medium of claim 17, wherein:
the at least one super CDFG is a plurality of super CDFGs,
the at least one component is a plurality of components, and
a number of super CDFGs is based on a product of a number of possible components and a number of possible sets of inputs.

19. A method comprising:
(a) generating at least one super control dataflow graph (CDFG) by applying a plurality of synchronous electronic system level (ESL) design constraints associated with an integrated circuit, wherein the at least one super CDFG is a graphical representation of types of tasks executed on the integrated circuit, and wherein the at least one super CDFG includes datapath components;
(b) determining a target security level for the integrated circuit by determining (i) a number of times each of the datapath components is used, (ii) a number of times each of the datapath components produces a particular output, and (iii) a time period that each of the datapath components takes to produce the particular output;
(c) determining at least one lower bound number for a number of CDFGs in the at least one super CDFG, wherein each of the CDFGs includes a plurality of nodes and a plurality of edges, and wherein each of the plurality of nodes represents an operation of the integrated circuit, and each of the plurality of edges represents a data flow of the integrated circuit;
(d) determining if the at least one lower bound is equal to or greater than the target security level;
(e) modifying the at least one lower bound by inserting at least one component on non-clock paths of a register transfer level (RTL) netlist if the at least one lower bound is less than the target security level;
(f) determining if the modified at least one lower bound is equal to or greater than the target security level; and
(g) repeating procedures (e) and (f) until the modified at least one lower bound is equal to or greater than the target security level.

20. A system, comprising:
at least one computer hardware arrangement configured to:
(a) generate at least one super control dataflow graph (CDFG) by applying a plurality of synchronous electronic system level (ESL) design constraints associated with an integrated circuit, wherein the at least one super CDFG is a graphical representation of types of tasks executed on the integrated circuit, and wherein the at least one super CDFG includes datapath components;
(b) determine a target security level for the integrated circuit by determining (i) a number of times each of the datapath components is used, (ii) the number of times each of the datapath components produces a particular output, and (iii) a time period that each of the datapath components takes to produce the particular output;
(c) determine at least one lower bound number for a number of CDFGs in the at least one super CDFG, wherein each of the CDFGs includes a plurality of nodes and a plurality of edges, and wherein each of the plurality of nodes represents an operation of the integrated circuit, and each of the plurality of edges represents a data flow of the integrated circuit;
(d) determine if the at least one lower bound is equal to or greater than the target security level;
(e) modify the at least one lower bound by inserting at least one component on non-clock paths of a register transfer level (RTL) netlist if the at least one lower bound is less than the target security level;

(f) determine if the modified at least one lower bound is equal to or greater than the target security level; and (g) repeat procedures (e) and (f) until the modified at least one lower bound is equal to or greater than the target security level.

* * * * *